(12) United States Patent
Chang et al.

(10) Patent No.: US 11,573,397 B2
(45) Date of Patent: Feb. 7, 2023

(54) OPTICAL IMAGE CAPTURING MODULE INCLUDING SIX LENSES OF −+−++−, −+++−+, −++++−, −+++−− OR +−+−++ REFRACTIVE POWERS

(71) Applicant: Ability Opto-Electronics Technology Co., Ltd., Taichung (TW)

(72) Inventors: Yeong-Ming Chang, Taichung (TW); Chien-Hsun Lai, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 343 days.

(21) Appl. No.: 16/697,043

(22) Filed: Nov. 26, 2019

(65) Prior Publication Data

US 2021/0072501 A1    Mar. 11, 2021

(30) Foreign Application Priority Data

Sep. 9, 2019   (TW) ................. 108132455

(51) Int. Cl.
  *G02B 13/00*   (2006.01)
  *G02B 9/62*    (2006.01)
(52) U.S. Cl.
  CPC ........... *G02B 9/62* (2013.01); *G02B 13/0045* (2013.01)
(58) Field of Classification Search
  CPC .. G02B 13/0065; G02B 9/62; G02B 13/0045; G02B 17/08
  See application file for complete search history.

(56) References Cited

U.S. PATENT DOCUMENTS

| 2010/0214664 A1* | 8/2010 | Chia .............. G02B 13/004 359/677 |
| 2013/0308033 A1* | 11/2013 | Kuo .............. G02B 13/18 348/335 |
| 2016/0187622 A1 | 6/2016 | Huang |

(Continued)

FOREIGN PATENT DOCUMENTS

| CN | 106814439 A | 6/2017 |
| CN | 107589520 A | 1/2018 |
| CN | 109307923 A | 2/2019 |

(Continued)

OTHER PUBLICATIONS

Office Action of corresponding CN application 201911281092.4, published on Nov. 2, 2021.

(Continued)

*Primary Examiner* — Wen Huang
(74) *Attorney, Agent, or Firm* — Wang Law Firm, Inc.

(57) ABSTRACT

A six-piece optical lens for capturing image and a six-piece optical module for capturing image are disclosed. In order from an object side to an image side, the optical lens along the optical axis includes a first lens with refractive power; a second lens with refractive power; a third lens with refractive power; a fourth lens with refractive power; a fifth lens with refractive power; a sixth lens with refractive power; and at least one of the image-side surface and object-side surface of each of the six lens elements is aspheric. The optical lens can increase aperture value and improve the imagining quality for use in compact cameras.

25 Claims, 10 Drawing Sheets

(56) References Cited

U.S. PATENT DOCUMENTS

2019/0094497 A1* 3/2019 Huang .................. G02B 9/62
2020/0150406 A1* 5/2020 Chen ..................... G03B 9/06

FOREIGN PATENT DOCUMENTS

| CN | 110133823 A | 8/2019 |
| CN | 110133824 A | 8/2019 |
| TW | 201624045 A | 7/2016 |

OTHER PUBLICATIONS

Office Action of corresponding TW application, published on Oct. 12, 2021.
Office Action of corresponding CN application, published on Mar. 8, 2022.

\* cited by examiner

OPTICAL IMAGE CAPTURING MODULE INCLUDING SIX LENSES OF –+–++–, –+++–+, –++++–, –+++–– OR +–+–++ REFRACTIVE POWERS

CROSS-REFERENCE TO RELATED APPLICATION

This application claims priority from Taiwan Patent Application No. 108132455, filed on Sep. 9, 2019, in the Taiwan Intellectual Property Office, the content of which is hereby incorporated by reference in its entirety for all purposes.

BACKGROUND OF THE INVENTION

1. Field of the Invention

The present invention relates to an optical image capturing system, and more particularly to a compact optical image capturing system which can be applied to electronic products.

2. Description of the Related Art

In recent years, with the rise of portable electronic devices having camera functionalities, the demand for an optical image capturing system has gradually been raised. The image sensing device of the ordinary photographing camera is commonly selected from a charge coupled device (CCD) or a complementary metal-oxide semiconductor sensor (CMOS Sensor). Also, as advanced semiconductor manufacturing technology enables the minimization of the pixel size of the image sensing device, the development of the optical image capturing system has gravitated towards the field of high pixels. Therefore, the requirement for high image quality has been rapidly increasing.

The traditional optical image capturing system of a portable electronic device comes with different designs, including a four-lens or a fifth-lens design. However, since the pixel density has continuously increased, more end-users are demanding a large aperture for such functionalities as micro filming and night view. The optical image capturing system of prior art cannot meet these high requirements and requires a higher order camera lens module.

Therefore, how to effectively increase quantity of incoming light of the optical lenses, and further improve image quality for the image formation, has become an important issue.

SUMMARY OF THE INVENTION

The aspect of embodiment of the present invention directs to an optical image capturing system and an optical image capturing lens which use combination of refractive power, convex and concave surfaces of six-piece optical lenses (the convex or concave surface in the present invention denotes the change of geometrical shape of an object side or an image side of each lens with different height from an optical axis) to increase the quantity of incoming light of the optical image capturing system, and to improve image quality for image formation, so as to be applied to compact electronic products.

The term and the definition to the lens parameter in the embodiment of the present invention are shown as below for further reference.

The Lens Parameters Related to the Length or the Height

The maximum height for image formation of the optical image capturing system is denoted by HOI. The height of the optical image capturing system is denoted by HOS. The distance from the object side of the first lens to the image side of the sixth lens is denoted by InTL. The distance from an aperture stop (aperture) to an image plane is denoted by InS. The distance from the first lens to the second lens is denoted by In12 (instance). The central thickness of the first lens of the optical image capturing system on the optical axis is denoted by TP1 (instance).

The Lens Parameters Related to the Material

The coefficient of dispersion of the first lens in the optical image capturing system is denoted by NA1 (instance). The refractive index of the first lens is denoted by Nd1 (instance).

The Lens Parameters Related to the Angle of View

The angle of view is denoted by AF. Half of the angle of view is denoted by HAF. The major light angle is denoted by MRA.

The Lens Parameters Related to the Exit/Entrance Pupil

The entrance pupil diameter of the optical image capturing system is denoted by HEP. A maximum effective half diameter (EHD) of any surface of the single lens is a perpendicular distance between an optical axis and an intersection point on the surface where the incident light with a maximum angle of view of the system passing the edge of the entrance pupil. For example, the maximum effective half diameter of the object side of the first lens may be expressed as EHD11. The maximum effective half diameter of the image side of the first lens may be expressed as EHD12. The maximum effective half diameter of the object side of the second lens may be expressed as EHD21. The maximum effective half diameter of the image side of the second lens may be expressed as EHD22. The maximum effective half diameters of any surfaces of other lenses in the optical image capturing system are expressed in a similar way.

The Lens Parameters Related to the Depth

The horizontal distance parallel to an optical axis from a maximum effective half diameter position of the object side of the sixth to an intersection point where the object side of the sixth lens crosses the optical axis is denoted by InRS61 (a depth of the maximum effective half diameter). The horizontal distance parallel to an optical axis from a maximum effective half diameter position the image side of the sixth lens to an intersection point where the object side of the sixth lens crosses the optical axis on the image side of the sixth lens is denoted by InRS62 (the depth of the maximum effective half diameter). The depths of the maximum effective half diameters (sinkage values) of object side and image side of other lenses are denoted in a similar way.

The Lens Parameter Related to the Shape of the Lens

The critical point C is a tangent point on a surface of a specific lens. The tangent point is tangent to a plane perpendicular to the optical axis except that an intersection point which crosses the optical axis on the specific surface of the lens. In accordance, the distance perpendicular to the optical axis between a critical point C51 on the object side of the fifth lens and the optical axis is HVT51 (instance). The distance perpendicular to the optical axis between a critical point C52 on the image side of the fifth lens and the optical axis is HVT52 (instance). The distance perpendicular to the optical axis between a critical point C61 on the object side of the sixth lens and the optical axis is HVT61 (instance). The distance perpendicular to the optical axis between a critical point C62 on the image side of the sixth lens and the optical axis is HVT62 (instance). The distances perpendicular to the optical axis between critical points on the object side or the image side of other lenses and the optical axis are denoted in a similar way as described above.

The object side of the sixth lens has one inflection point IF611 which is the first nearest to the optical axis. The sinkage value of the inflection point IF611 is denoted by SGI611. SGI611 is a horizontal distance parallel to the optical axis, which is from an intersection point where the object side of the sixth lens crosses the optical axis to the inflection point on the object side of the sixth lens that is the first nearest to the optical axis. The distance perpendicular to the optical axis between the inflection point IF611 and the optical axis is HIF611 (instance). The image side of the sixth lens has one inflection point IF621 which is the first nearest to the optical axis and the sinkage value of the inflection point IF621 is denoted by SGI621 (instance). SGI621 is a horizontal distance parallel to the optical axis, which is from the intersection point where the image side of the sixth lens crosses the optical axis to the inflection point on the image side of the sixth lens that is the first nearest to the optical axis. The distance perpendicular to the optical axis between the inflection point IF621 and the optical axis is HIF621 (instance).

The object side of the sixth lens has one inflection point IF612 which is the second nearest to the optical axis and the sinkage value of the inflection point IF612 is denoted by SGI612 (instance). SGI612 is a horizontal distance parallel to the optical axis, which is from an intersection point where the object side of the sixth lens crosses the optical axis to the inflection point on the object side of the sixth lens that is the second nearest to the optical axis. The distance perpendicular to the optical axis between the inflection point IF612 and the optical axis is HIF612 (instance). The image side of the sixth lens has one inflection point IF622 which is the second nearest to the optical axis and the sinkage value of the inflection point IF622 is denoted by SGI622 (instance). SGI622 is a horizontal distance parallel to the optical axis, which is from an intersection point where the image side of the sixth lens crosses the optical axis to the inflection point on the image side of the sixth lens that is the second nearest to the optical axis. The distance perpendicular to the optical axis between the inflection point IF622 and the optical axis is HIF622 (instance).

The object side of the sixth lens has one inflection point IF613 which is the third nearest to the optical axis and the sinkage value of the inflection point IF613 is denoted by SGI613 (instance). SGI613 is a horizontal distance parallel to the optical axis, which is from an intersection point where the object side of the sixth lens crosses the optical axis to the inflection point on the object side of the sixth lens that is the third nearest to the optical axis. A distance perpendicular to the optical axis between the inflection point IF613 and the optical axis is HIF613 (instance). The image side of the sixth lens has one inflection point IF623 which is the third nearest to the optical axis and the sinkage value of the inflection point IF623 is denoted by SGI623 (instance). SGI623 is a horizontal distance parallel to the optical axis, which is from an intersection point where the image side of the sixth lens crosses the optical axis to the inflection point on the image side of the sixth lens that is the third nearest to the optical axis. The distance perpendicular to the optical axis between the inflection point IF623 and the optical axis is HIF623 (instance).

The object side of the sixth lens has one inflection point IF614 which is the fourth nearest to the optical axis and the sinkage value of the inflection point IF614 is denoted by SGI614 (instance). SGI614 is a horizontal distance parallel to the optical axis, which is from an intersection point where the object side of the sixth lens crosses the optical axis to the inflection point on the object side of the sixth lens that is the fourth nearest to the optical axis. The distance perpendicular to the optical axis between the inflection point IF614 and the optical axis is HIF614 (instance). The image side of the sixth lens has one inflection point IF624 which is the fourth nearest to the optical axis and the sinkage value of the inflection point IF624 is denoted by SGI624 (instance). SGI624 is a horizontal distance parallel to the optical axis, which is from an intersection point where the image side of the sixth lens crosses the optical axis to the inflection point on the image side of the sixth lens that is the fourth nearest to the optical axis. The distance perpendicular to the optical axis between the inflection point IF624 and the optical axis is HIF624 (instance).

The inflection points on the object sides or the image side of the other lenses and the distances perpendicular to the optical axis thereof or the sinkage values thereof are denoted in a similar way described above.

The Lens Parameters Related to the Aberration

Optical distortion for image formation in the optical image capturing system is denoted by ODT. TV distortion for image formation in the optical image capturing system is denoted by TDT. Further, the degree of aberration offset within a range of 50% to 100% of the field of view of the image can be further limited. An offset of the spherical aberration is denoted by DFS. An offset of the coma aberration is denoted by DFC.

The characteristic diagram of modulation transfer function of the optical image capturing system is used for testing and evaluating the contrast ratio and the sharpness ratio of the image. The vertical coordinate axis of the characteristic diagram of modulation transfer function indicates a contrast transfer rate (with values from 0 to 1). The horizontal coordinate axis indicates a spatial frequency (cycles/mm; 1 p/mm; line pairs per mm). Theoretically, an ideal image capturing system can clearly and distinctly show the line contrast of a photographed object. However, the values of the contrast transfer rate at the vertical coordinate axis are smaller than 1 in the actual optical image capturing system. In addition, to achieve a fine degree of recovery in the edge region of the image is generally more difficult than in the central region of the image. The contrast transfer rates (MTF values) with spatial frequencies of 55 cycles/mm at the optical axis, 0.3 field of view and 0.7 field of view of visible light spectrum on the image plane may be expressed respectively as MTFE0, MTFE3 and MTFE7. The contrast transfer rates (MTF values) with spatial frequencies of 110 cycles/mm at the optical axis, 0.3 field of view, and 0.7 field of view of visible light spectrum on the image plane may be respectively expressed as MTFQ0, MTFQ3 and MTFQ7. The contrast transfer rates (MTF values) with spatial frequencies of 220 cycles/mm at the optical axis, 0.3 field of view, and 0.7 field of view of visible light spectrum on the image plane may be respectively expressed as MTFH0, MTFH3 and MTFH7. The contrast transfer rates (MTF values) with spatial frequencies of 440 cycles/mm at the optical axis, 0.3 field of view, and 0.7 field of view of visible light spectrum on the image plane may be respectively expressed as MTF0, MTF3 and MTF7. The three fields of view described above are representative to the center, the internal field of view and the external field of view of the lens. Therefore, the three fields of view described above may be used to evaluate whether the performance of the specific optical image capturing system is excellent. If the design of the optical image capturing system corresponds to a sensing device which pixel size is below and equal to 1.12 micrometers, the quarter spatial frequencies, the half spatial frequencies (half frequencies) and the full spatial frequencies (full frequencies) of the characteristic diagram of modulation transfer function are respectively at least 110 cycles/mm, 220 cycles/mm and 440 cycles/mm.

If an optical image capturing system needs to satisfy conditions with images of the infrared spectrum and the visible spectrum simultaneously, such as the requirements for night vision in low light, the used wavelength may be 850 nm or 800 nm. Since the main function is to recognize the shape of an object formed in a black-and-white environment, high resolution is unnecessary and thus the spatial frequency which is less than 110 cycles/mm may be selected to evaluate the performance of the specific optical image capturing system on the infrared light spectrum. When the operation wavelength 850 nm is focused on the image plane, the contrast transfer rates (MTF values) with a spatial frequency of 55 cycles/mm where the images are at the optical axis, 0.3 field of view and 0.7 field of view may be respectively expressed as MTFI0, MTFI3 and MTFI7. However, because the difference between the infrared wavelength of 850 nm or 800 nm and the general visible light wavelength is large, the optical image capturing system which not only has to focus on the visible light and the infrared light (dual-mode) but also has to achieve a certain function in the visible light and the infrared light respectively has a significant difficulty in design.

The present invention provides an optical image capturing system, an object side or an image side of the sixth lens may have inflection points, such that the angle of incidence from each field of view to the sixth lens can be adjusted effectively and the optical distortion and the TV distortion can be corrected as well. Furthermore, the surfaces of the sixth lens may have a better optical path adjusting ability to acquire better image quality.

The present invention provides an optical image capturing system, from an object side to an image side, comprising a first lens with refractive power, a second lens with refractive power, a third lens with refractive power, a fourth lens with refractive power, a fifth lens with refractive power, a sixth lens with refractive power, an image plane; and at least one reflective element. The optical image capturing system comprises the six lenses with refractive power, the reflective element is disposed in front of the image plane, a maximum height for image formation on the image plane perpendicular to an optical axis in the optical image capturing system is HOI, at least one lens among the first lens to the sixth lens has positive refractive power, focal lengths of the first lens through the sixth lens are f1, f2, f3, f4, f5 and f6, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the sixth lens is denoted by InTL, a half maximum angle of view of the optical image capturing system is denoted by HAF, thicknesses of the first lens to the sixth lens at height of ½ HEP parallel to the optical axis are respectively denoted by ETP1, ETP2, ETP3, ETP4, ETP5 and ETP6, a sum of ETP1 to ETP6 described above is denoted by SETP, thicknesses of the first lens to the sixth lens on the optical axis are respectively denoted by TP1, TP2, TP3, TP4, TP5 and TP6, a sum of TP1 to TP6 described above is denoted by STP, and the following conditions are satisfied: $1.0 \leq f/HEP \leq 10.0$; $0\ deg < HAF \leq 150\ deg$; $0.5 \leq HOS/f \leq 15$; and $0.5 \leq SETP/STP < 1$.

The present invention provides an optical image capturing system, from an object side to an image side, comprising a first lens with refractive power, a second lens with refractive power, a third lens with refractive power, a fourth lens with refractive power, a fifth lens with refractive power, a sixth lens with refractive power, an image plane; and at least one reflective element. The optical image capturing system comprises the six lenses with refractive power, the reflective element is disposed in front of the sixth lens, a maximum height for image formation on the image plane perpendicular to an optical axis in the optical image capturing system is HOI, at least one lens among the first lens to the sixth lens has positive refractive power, focal lengths of the first lens through the sixth lens are f1, f2, f3, f4, f5 and f6, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the sixth lens is denoted by InTL, a half maximum angle of view of the optical image capturing system is denoted by HAF, a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the sixth lens at height of ½ HEP is denoted by EIN, and the following conditions are satisfied: $1.0 \leq f/HEP \leq 10.0$; $0\ deg < HAF \leq 150\ deg$; $0.5 \leq HOS/f \leq 15$; and $0.2 \leq EIN/ETL < 1$.

The present invention provides an optical image capturing system, from an object side to an image side, comprising a mechanism pinhole, a first lens with refractive power, a second lens with refractive power, a third lens with refractive power, a fourth lens with refractive power, a fifth lens with refractive power, a sixth lens with refractive power, an image plane; and at least one reflective element disposed in front of the third lens. The mechanism pinhole limits a path of light incident from an object side, and has a diameter denoted by DDH. The optical image capturing system comprises the six lenses with refractive power, a maximum height for image formation on the image plane perpendicular to an optical axis in the optical image capturing system is HOI, at least one of the first lens through the sixth lens is made of glass, focal lengths of the first lens through the sixth lens are f1, f2, f3, f4, f5 and f6, respectively, and a focal length of the optical image capturing system is f, the entrance pupil diameter of the optical image capturing system is denoted by HEP, a half maximum angle of view of the optical image capturing system is denoted by HAF, a distance on an optical axis from an object side of the first lens to the image plane is denoted by HOS, a distance on an optical axis from the object side of the first lens to the image side of the sixth lens is denoted by InTL, a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the sixth lens at height of ½ HEP is denoted by EIN, and the following conditions are satisfied: $1.0 \leq f/HEP \leq 10$; $0\ deg < HAF \leq 150\ deg$; $0.5 \leq HOS/f \leq 15$; $0.5 \leq HOS/HOI \leq 10$; $0.2 \leq EIN/ETL < 1$; and $0 < DDH \leq 10\ mm$.

The thickness of a single lens at a height of ½ entrance pupil diameter (HEP) particularly affects the corrected aberration of common area of each field of view of light and the capability of correcting the optical path difference between each field of view of light in the scope of ½ entrance pupil diameter (HEP). The capability of aberration correction is enhanced if the thickness of the lens becomes greater, but the difficulty for manufacturing is also increased at the same time. Therefore, the thickness of a single lens at the height of ½ entrance pupil diameter (HEP) needs to be controlled. The ratio relationship (ETP/TP) between the thickness (ETP) of the lens at a height of ½ entrance pupil diameter (HEP) and the thickness (TP) of the lens on the optical axis needs to be controlled in particular. For example, the thickness of the first lens at a height of ½ entrance pupil diameter (HEP) may be expressed as ETP1. The thickness of the second lens at a height of ½ entrance pupil diameter (HEP) may be expressed as ETP2. The thicknesses of other lenses at a height of ½ entrance pupil diameter (HEP) in the optical image capturing system are expressed in a similar way. The sum of ETP1 to ETP6 described above may be expressed as SETP. The embodiments of the present invention may satisfy the following relationship: $0.3 \leq SETP/EIN < 1$.

In order to achieve a balance between enhancing the capability of aberration correction and reducing the difficulty for manufacturing, the ratio relationship (ETP/TP) between the thickness (ETP) of the lens at the height of ½ entrance pupil diameter (HEP) and the thickness (TP) of the lens on the optical axis needs to be controlled in particular. For example, the thickness of the first lens at the height of ½ entrance pupil diameter (HEP) may be expressed as ETP1. The thickness of the first lens on the optical axis may be expressed as TP1. The ratio between ETP1 and TP1 may be expressed as ETP1/TP1. The thickness of the second lens at the height of ½ entrance pupil diameter (HEP) may be expressed as ETP2. The thickness of the second lens on the optical axis may be expressed as TP2. The ratio between ETP2 and TP2 may be expressed as ETP2/TP2. The ratio relationships between the thicknesses of other lenses at height of ½ entrance pupil diameter (HEP) and the thicknesses (TP) of the lens on the optical axis lens in the optical image capturing system are expressed in a similar way. The embodiments of the present invention may satisfy the following relationship: $0.2 \leq ETP/TP \leq 3$.

The horizontal distance between two adjacent lenses at height of ½ entrance pupil diameter (HEP) may be expressed as ED. The horizontal distance (ED) described above is parallel to the optical axis of the optical image capturing system and particularly affects the corrected aberration of common area of each field of view of light and the capability of correcting the optical path difference between each field of view of light at the position of ½ entrance pupil diameter (HEP). The capability of aberration correction may be enhanced if the horizontal distance becomes greater, but the difficulty for manufacturing is also increased and the degree of 'miniaturization' to the length of the optical image capturing system is restricted. Therefore, the horizontal distance (ED) between two specific adjacent lens at the height of ½ entrance pupil diameter (HEP) must be controlled.

In order to achieve a balance between enhancing the capability of correcting aberration and reducing the difficulty for 'minimization' to the length of the optical image capturing system, the ratio relationship (ED/IN) of the horizontal distance (ED) between the two adjacent lenses at height of ½ entrance pupil diameter (HEP) to the horizontal distance (IN) between the two adjacent lenses on the optical axis particularly needs to be controlled. For example, the horizontal distance between the first lens and the second lens at height of ½ entrance pupil diameter (HEP) may be expressed as ED12. The horizontal distance on the optical axis between the first lens and the second lens may be expressed as IN12. The ratio between ED12 and IN12 may be expressed as ED12/IN12. The horizontal distance between the second lens and the third lens at height of ½ entrance pupil diameter (HEP) may be expressed as ED23. The horizontal distance on the optical axis between the second lens and the third lens may be expressed as IN23. The ratio between ED23 and IN23 may be expressed as ED23/IN23. The ratio relationships of the horizontal distances between other two adjacent lenses in the optical image capturing system at height of ½ entrance pupil diameter (HEP) to the horizontal distances on the optical axis between the two adjacent lenses are expressed in a similar way.

The horizontal distance parallel to the optical axis from a coordinate point on the image side of the sixth lens at height ½ HEP to the image plane may be expressed as EBL. The horizontal distance parallel to the optical axis from an intersection point where the image side of the sixth lens crosses the optical axis to the image plane may be expressed as BL. The embodiments of the present invention are able to achieve a balance between enhancing the capability of aberration correction and reserving space to accommodate other optical lenses and the following condition may be satisfied: $0.2 \leq EBL/BL \leq 1.1$. The optical image capturing system may further include a light filtering element. The light filtering is located between the sixth lens and the image plane. The distance parallel to the optical axis from a coordinate point on the image side of the sixth lens at height of ½ HEP to the light filtering may be expressed as EIR. The distance parallel to the optical axis from an intersection point where the image side of the sixth lens crosses the optical axis to the light filtering may be expressed as PIR. The embodiments of the present invention may satisfy the following condition: $0.1 \leq EIR/PIR \leq 1.1$.

The height of optical system (HOS) may be reduced to achieve the minimization of the optical image capturing system when the absolute value of f1 is larger than f6 ($|f1| > |f6|$).

When $|f2|+|f3|+|f4|+|f5|$ and $|f1|+|f6|$ meet the aforementioned conditions, at least one lens among the second lens to the fifth lens may have a weak positive refractive power or a weak negative refractive power. The weak refractive power indicates that an absolute value of the focal length of a specific lens is greater than 10. When at least one lens among the second lens to the fifth has the weak positive refractive power, the positive refractive power of the first lens can be shared by this configuration, such that the unnecessary aberration will not appear too early. On the contrary, when at least one lens among the second lens to the fifth lens has the weak negative refractive power, the aberration of the optical image capturing system can be slightly corrected.

Besides, the sixth lens may have negative refractive power, and the image side thereof may be a concave surface. Hereby, this configuration is beneficial to shorten the back focal length of the optical image capturing system so as to keep the optical image capturing system minimized. Moreover, at least one surface of the sixth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

DESCRIPTION OF THE PREFERRED EMBODIMENTS

Figure 1A:
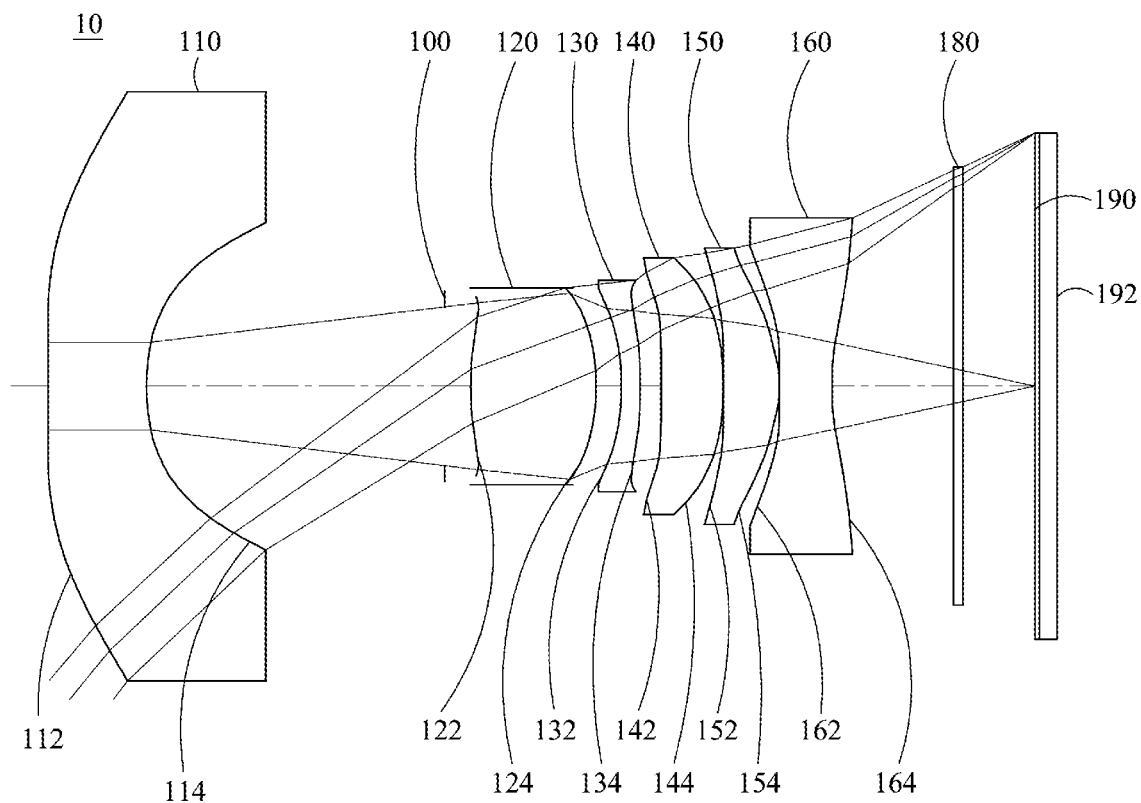
FIG. 1A is a schematic view of the optical image capturing system according to the first embodiment of the present invention.

The advantages, features, and technical methods of the present invention are to be explained in detail with reference to the exemplary embodiments and the figures for the purpose of being more easily to be understood. Moreover, the present invention may be realized in different forms, and should not be construed as being limited to the embodiments set forth herein. Conversely, for a person skilled in the art, the embodiments provided shall make the present invention convey the scope more thoroughly, comprehensively, and completely. In addition, the present invention shall be defined only by the appended claims.

An optical image capturing system is provided, which includes, in the order from the object side to the image side, a first lens, a second lens, a third lens, a fourth lens, a fifth lens, a sixth lens, and an image plane. The optical image capturing system may further include an image sensing device, which is disposed on the image plane.

The optical image capturing system may use three sets of wavelengths which are respectively 486.1 nm, 587.5 nm and 656.2 nm, wherein 587.5 nm is served as the primary reference wavelength and a reference wavelength for retrieving technical features. The optical image capturing system may also use five sets of wavelengths which are respectively 470 nm, 510 nm, 555 nm, 610 nm and 650 nm, wherein 555 nm is served as the primary reference wavelength and a reference wavelength for retrieving technical features.

The ratio of the focal length f of the optical image capturing system to a focal length fp of each of lenses with positive refractive power is PPR. The ratio of the focal length f of the optical image capturing system to a focal length fn of each of lenses with negative refractive power is NPR. The sum of the PPR of all lenses with positive refractive power is $\Sigma PPR$. The sum of the NPR of all lenses with negative refractive power is $\Sigma NPR$.

The control of the total refractive power and the total length of the optical image capturing system is favorable when following conditions are satisfied: $0.5 \leq \Sigma PPR/|\Sigma NPR| \leq 15$. Preferably, the following relationship is satisfied: $1 \leq \Sigma PPR/|\Sigma NPR| \leq 3.0$.

The optical image capturing system may further include an image sensing device which is disposed on an image plane. A half of a diagonal of an effective detection field of the image sensing device (imaging height or the maximum image height of the optical image capturing system) is HOI. The distance on the optical axis from the object side of the first lens to the image plane is HOS. The following relationships are satisfied: $HOS/HOI \leq 50$ and $0.5 \leq HOS/f \leq 150$. Preferably, the following relationships is satisfied: $1 \leq HOS/HOI \leq 40$ and $1 \leq HOS/f \leq 140$. Hereby, the miniaturization of the optical image capturing system can be maintained effectively, so as to be carried by lightweight portable electronic devices.

In addition, in the optical image capturing system of the present invention, according to different requirements, at least one aperture may be arranged for reducing stray light and improving the image quality.

Specifically, the disposition of the aperture may be a front aperture or a middle aperture in the optical image capturing module in the present invention. The front aperture is the aperture disposed between the shot object and the first lens. The middle aperture is the aperture disposed between the first lens and the image plane. If the aperture is the front aperture, a longer distance may be created between the exit pupil and the image plane in the optical image capturing module, so that more optical elements may be accommodated and the efficiency of image sensor elements receiving images may be increased. If the aperture is the middle aperture, the field of view of the system may be expended in such a way that the optical image capturing module has the advantages of a wide-angle lens. InS is defined as the distance from the aforementioned aperture to the image plane, which satisfies the following condition: 0.1≤InS/HOS≤1.1. Therefore, the features of the optical image capturing module maintained in miniaturization and having wide-angle may be attended simultaneously.

In the optical image capturing system of the present invention, the distance from the object side of the first lens to the image side of the sixth lens is InTL. A total central thickness of all lenses with refractive power on the optical axis is ΣTP. The following relationship is satisfied: 0.1≤ΣTP/InTL≤0.9. Hereby, the contrast ratio for the image formation in the optical image capturing system and yield rate for manufacturing the lens can be given consideration simultaneously, and a proper back focal length is provided to dispose other optical components in the optical image capturing system.

The curvature radius of the object side of the first lens is R1. The curvature radius of the image side of the first lens is R2. The following relationship is satisfied: 0.001≤|R1/R2|≤25. Hereby, the first lens may have proper strength of the positive refractive power, so as to avoid the longitudinal spherical aberration from increasing too fast. Preferably, the following relationship may be satisfied: 0.01≤|R1/R2|<12.

The curvature radius of the object side of the sixth lens is R11. The curvature radius of the image side of the sixth lens is R12. The following relationship is satisfied: −7<(R11−R12)/(R11+R12)<50. Hereby, the astigmatism generated by the optical image capturing system can be corrected beneficially.

The distance between the first lens and the second lens on the optical axis is IN12. The following relationship is satisfied: IN12/f≤60. Hereby, the chromatic aberration of the lenses can be improved, such that the performance can be increased.

The distance between the fifth lens and the sixth lens on the optical axis is IN56. The following relationship is satisfied: IN56/f≤3.0. Hereby, the chromatic aberration of the lenses can be improved, such that the performance can be increased.

Central thicknesses of the first lens and the second lens on the optical axis are respectively TP1 and TP2. The following relationship is satisfied: 0.1≤(TP130 IN12)/TP2≤10. Hereby, the sensitivity produced by the optical image capturing system can be controlled, and the performance can be increased.

Central thicknesses of the fifth lens and the sixth lens on the optical axis are respectively TP5 and TP6, and a distance between the aforementioned two lenses on the optical axis is IN56. The following relationship is satisfied: 0.1≤(TP6+IN56)/TP5≤15. Hereby, the sensitivity produced by the optical image capturing system can be controlled and the total height of the optical image capturing system can be reduced.

Central thicknesses of the second lens, the third lens and the fourth lens on the optical axis are respectively denoted by TP2, TP3 and TP4. The distance between the second lens and the third lens on the optical axis is IN23. A distance between the third lens and the forth lens on the optical axis is IN34. A distance between the fourth lens and the fifth lens on the optical axis is IN45. The distance between an object side of the first lens and an image side of the sixth lens is InTL. The following relationship is satisfied: 0.1≤TP4/(IN34+TP4+IN45)<1. Hereby, this configuration is helpful to slightly correct the aberration of the propagating process of the incident light layer by layer, and decrease the total height of the optical image capturing system.

In the optical image capturing system of the first embodiment, a distance perpendicular to the optical axis between a critical point C61 on an object side of the sixth lens and the optical axis is HVT61. The distance perpendicular to the optical axis between a critical point C62 on an image side of the sixth lens and the optical axis is HVT62. The horizontal distance parallel to the optical axis from an intersection point where the object side of the sixth lens crosses the optical axis to the critical point C61 may be expressed as SGC61. The horizontal distance parallel to the optical axis from an intersection point where the image side of the sixth lens crosses the optical axis to the critical point C62 may be expressed as SGC62. The following relationships may be satisfied: 0 mm≤HVT61≤3 mm, 0 mm<HVT62≤6 mm, 0≤HVT61/HVT62, 0 mm≤|SGC61|0.5 mm; 0 mm<|SGC62|≤2 mm and 0<|SGC62|/(|SGC62|+TP6)≤0.9. Hereby, the aberration of the off-axis field of view can be corrected effectively.

The following relationship is satisfied for the optical image capturing system of the present invention: 0.2≤HVT62/HOI≤0.9. Preferably, the following relationship may be satisfied: 0.3≤HVT62/HOI≤0.8. Hereby, the aberration at surrounding field of view for the optical image capturing system can be corrected beneficially.

The following relationship is satisfied for the optical image capturing system of the present invention: 0≤HVT62/HOS≤0.5. Preferably, the following relationship may be satisfied: 0.2≤HVT62/HOS≤0.45. Hereby, the aberration at surrounding field of view for the optical image capturing system can be corrected beneficially.

In the optical image capturing system of the present invention, the horizontal distance parallel to an optical axis from an inflection point on the object side of the sixth lens which is the first nearest to the optical axis to an intersection point where the object side of the sixth lens crosses the optical axis is denoted by SGI611. The horizontal distance parallel to an optical axis from an inflection point on the image side of the sixth lens which is the first nearest to the optical axis to an intersection point where the image side of the sixth lens crosses the optical axis is denoted by SGI621. The following relationships may be satisfied: 0<SGI611/(SGI611+TP6)≤0.9 and 0<SGI621/(SGI621+TP6)≤0.9. Preferably, the following relationships may be satisfied: 0.1≤SGI611/(SGI611+TP6)0.6 and 0.1≤SGI621/(SGI621+TP6)0.6.

The horizontal distance parallel to the optical axis from the inflection point on the object side of the sixth lens which is the second nearest to the optical axis to an intersection point where the object side of the sixth lens crosses the optical axis is denoted by SGI612. The horizontal distance parallel to an optical axis from an inflection point on the image side of the sixth lens which is the second nearest to the optical axis to an intersection point where the image side of the sixth lens crosses the optical axis is denoted by SGI622. The following relationships may be satisfied: 0<SGI612/(SGI612+TP6)≤0.9 and 0<SGI622/(SGI622+ TP6)≤0.9. Preferably, the following relationships may be satisfied: 0.15 SGI612/(SGI612+TP6)≤0.6 and 0.1≤SGI622/ (SGI622+TP6)≤0.6.

The distance perpendicular to the optical axis between the inflection point on the object side of the sixth lens which is the first nearest to the optical axis and the optical axis is denoted by HIF611. The distance perpendicular to the optical axis between an intersection point where the image side of the sixth lens crosses the optical axis and an inflection point on the image side of the sixth lens which is the first nearest to the optical axis is denoted by HIF621. The following relationships may be satisfied: 0.001 mm≤|HIF611|≤5 mm and 0.001 mm≤|HIF621|≤5 mm. Preferably, the following relationships may be satisfied: 0.1 mm≤|HIF611|≤3.5 mm and 1.5 mm≤|HIF621|≤3.5 mm.

The distance perpendicular to the optical axis between the inflection point on the object side of the sixth lens which is the second nearest to the optical axis and the optical axis is denoted by HIF612. The distance perpendicular to the optical axis between an intersection point where the image side of the sixth lens crosses the optical axis and an inflection point on the image side of the sixth lens which is the second nearest to the optical axis is denoted by HIF622. The following relationships may be satisfied: 0.001 mm≤|HIF612|≤5 mm and 0.001 mm≤|HIF622|≤5 mm. Preferably, the following relationships may be satisfied: 0.1 mm≤|HIF622|≤3.5 mm and 0.1 mm≤|HIF612|≤3.5 mm.

The distance perpendicular to the optical axis between the inflection point on the object side of the sixth lens which is the third nearest to the optical axis and the optical axis is denoted by HIF613. The distance perpendicular to the optical axis between an intersection point where the image side of the sixth lens crosses the optical axis and an inflection point on the image side of the sixth lens which is the third nearest to the optical axis is denoted by HIF623. The following relationships are satisfied: 0.001 mm≤|HIF613|≤5 mm and 0.001 mm≤|HIF623|≤5 mm. Preferably, the following relationships may be satisfied: 0.1 mm≤|HIF623|≤3.5 mm and 0.1 mm≤|HIF613|≤3.5 mm.

The distance perpendicular to the optical axis between the inflection point on the object side of the sixth lens which is the fourth nearest to the optical axis and the optical axis is denoted by HIF614. The distance perpendicular to the optical axis between an intersection point where the image side of the sixth lens crosses the optical axis and an inflection point on the image side of the sixth lens which is the fourth nearest to the optical axis is denoted by HIF624. The following relationships are satisfied: 0.001 mm≤|HIF614|≤5 mm and 0.001 mm≤|HIF624|≤5 mm. Preferably, the following relationships may be satisfied: 0.1 mm≤|HIF624|≤3.5 mm and 0.1 mm≤|HIF614|≤3.5 mm.

In one optical embodiment of the optical image capturing system of the present invention, the chromatic aberration of the optical image capturing system can be corrected by alternatively arranging the lenses with large coefficient of dispersion and small coefficient of dispersion.

The equation for the aspheric surface as mentioned above is:

$$z=ch^2/[1+[1-(k30\ 1)c^2h^2]^{0.5}]+A_4h^4+A_6h^6+A_8h^8+A_{10}h^{10}+A_{12}h^{10}+A_{12}h^{12}+A_{14}h^{14}+A_{16}h^{16}+A_{18}h^{18}A_{20\ h}h^{20}+ \quad (1)$$

Wherein, z is the position value of the position along the optical axis at the height h where the surface apex is regarded as a reference; k is the conic coefficient; c is the reciprocal of curvature radius; and $A_4, A_6, A_8, A_{10}, A_{12}, A_{14}, A_{16}, A_{18}$, and $A_{20}$ are high order aspheric coefficients.

In the optical image capturing module provided by the present invention, the material of the lens may be made of glass or plastic. Using plastic as the material for producing the lens may effectively reduce the cost of manufacturing. In addition, using glass as the material for producing the lens may control the heat effect and increase the designed space configured by the refractive power of the optical image capturing module. Moreover, the object side surface and the image side surface from the first lens to the sixth lens may be aspheric, which may obtain more control variables. Apart from eliminating the aberration, the number of lenses used can be reduced compared with that of traditional lenses used made by glass. Thus, the total height of the optical image capturing module may be reduced effectively.

Furthermore, in the optical image capturing module provided by the present invention, when the surface of the lens is a convex surface, the surface of the lens adjacent to the optical axis is convex in principle. When the surface of the lens is a concave surface, the surface of the lens adjacent to the optical axis is concave in principle.

The optical image capturing system of the present invention can be applied to the optical image capturing system with automatic focus based on the demand and has the characteristics of good aberration correction and good image quality. Thereby, the optical image capturing system expands the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the shooting process.

At least one of the first lens, the second lens, the third lens, the fourth lens, the fifth lens and the sixth lens of the optical image capturing system of the present invention may further be designed as a light filtering element with a wavelength of less than 500 nm based on the demand. The light filtering element may be made by coating film on at least one surface of that lens with certain filtering function, or forming that lens with material that can filter light with short wavelength.

The image plane of the optical image capturing system of the present invention may be a plane or a curved surface based on the design requirements. When the image plane is a curved surface (e.g. a spherical surface with curvature radius), the decrease of the required incident angle to focus rays on the image plane is helpful. In addition to the aid of the miniaturization of the length of the optical image capturing system (TTL), this configuration is helpful to elevate the relative illumination at the same time.

Figure 7:
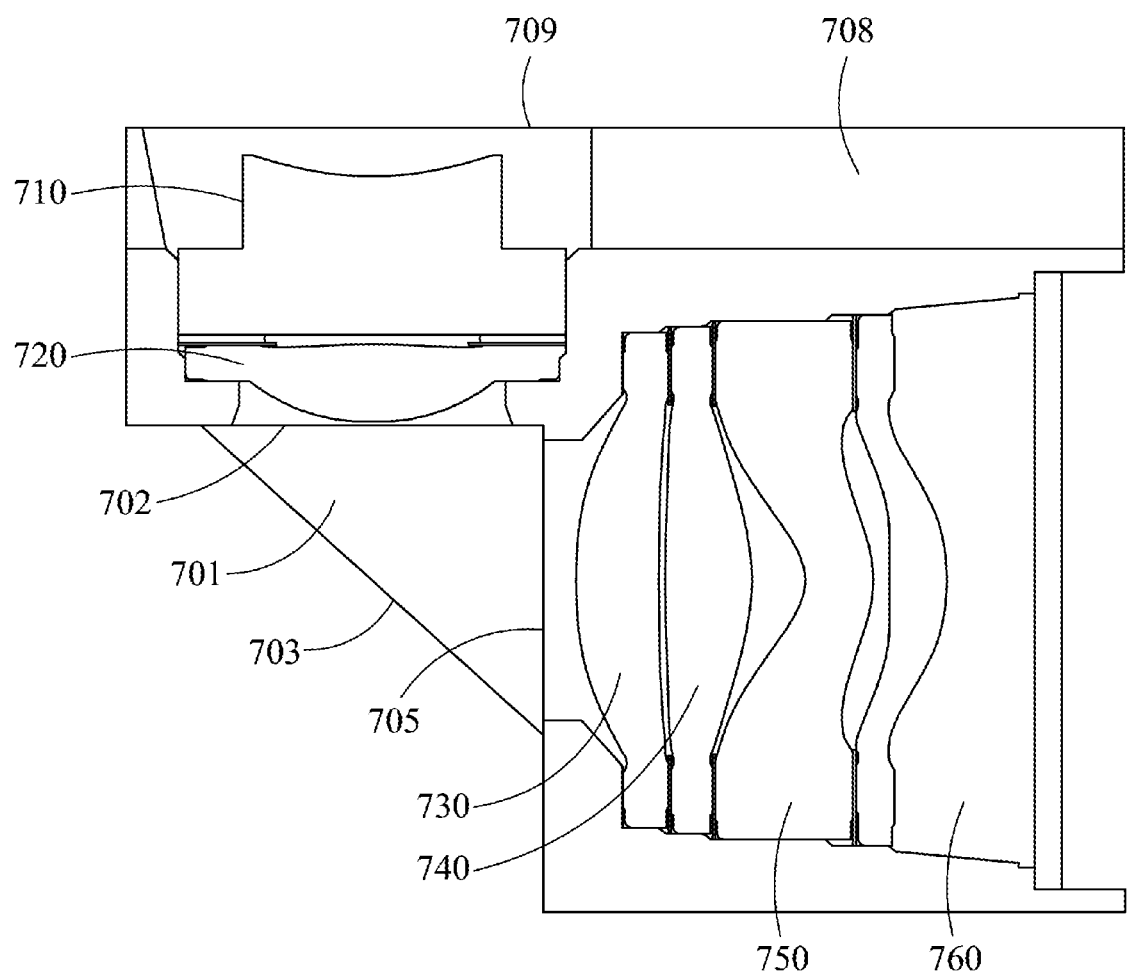
FIG. 7 is a structural diagram of the optical image capturing system, having a prism, mounted in an electronic device according to the embodiment in the present invention.

In the electronic device mounted with the optical image capturing system of the present invention, a mechanism light incident hole can be formed on an object side. Please refer to FIG. 7. The mechanism light incident hole can be a front camera lens hole of the electronic device 708 and configured to limit the path of incident light on the object side. The mechanism light incident hole diameter 709 is denoted by DDH. According to different requirements, the optical image capturing system of the present invention can include at least one reflective element such as a prism 701 or a reflective mirror, to improve the spatial configuration and manipulation of the optical imaging system installed on the end product, and allow the imaging system to increase total number of the lens elements in the limited mechanism space. The reflective element can be disposed between the lens elements of the optical image capturing system, to reduce the mechanism diameter through which incident light travels toward to the first lens. Furthermore, the reflective element can be disposed on object side of the first lens, and this configuration is beneficial to reduce the length of the optical image capturing system. According to different requirements, the amount of the reflective elements can be two or more, and the disposal of the reflecting surface can be adjusted according to different requirements in space configuration. The prism can be made of material with appropriate refractive index or Abbe number; for example, the prism can be made of glass or plastic. The thickness of the prism means a sum of optical axis path lengths inside the prism, and is denoted by PT. The thickness PT is a sum of an incident light path PT1 (that is, the optical path of central field of view or the optical axis) and an exit light path PT2 (that is, the optical path of central field of view or the optical axis), that is, PT is equal to the sum of PT1 and PT2 (PT=PT1+PT2). The thickness of the prism is mainly determined by the refractive index of the material thereof, the view angle of the optical image capturing system, and the size of the aperture.

According to the above embodiments, the specific embodiments with figures are presented in detail as below.

First Embodiment

Figure 1B:
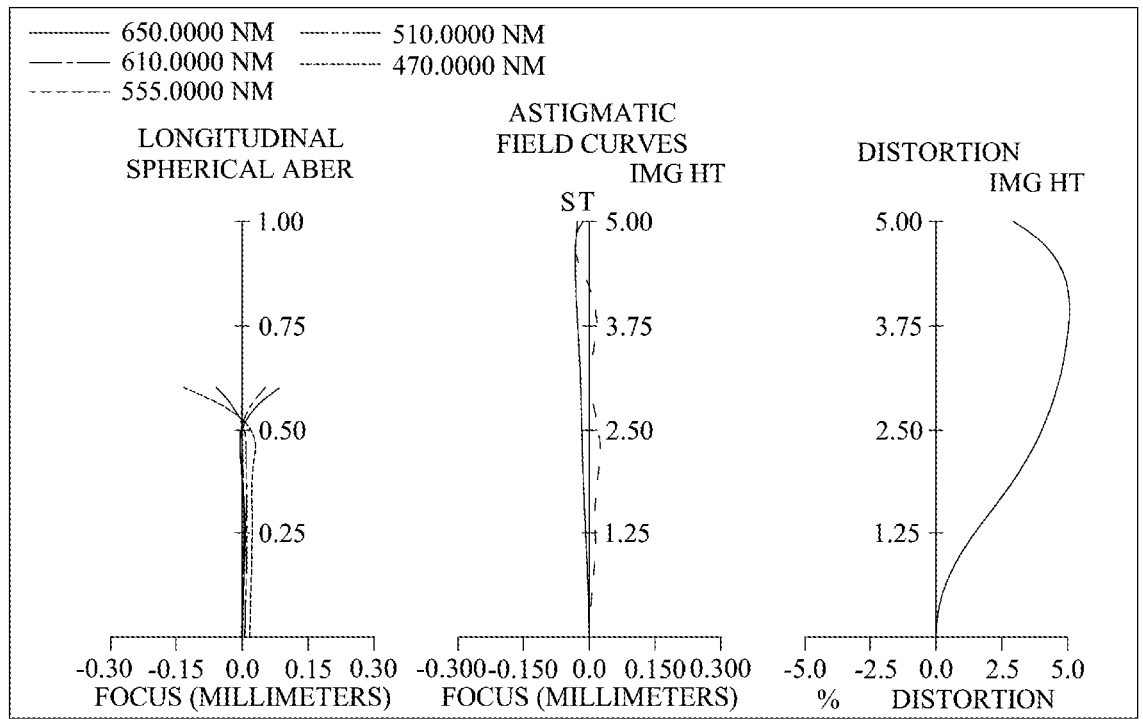
FIG. 1B is a curve diagram illustrating the spherical aberration, astigmatism and optical distortion of the optical image capturing system in order from left to right according to the first embodiment of the present invention.
Figure 1C:
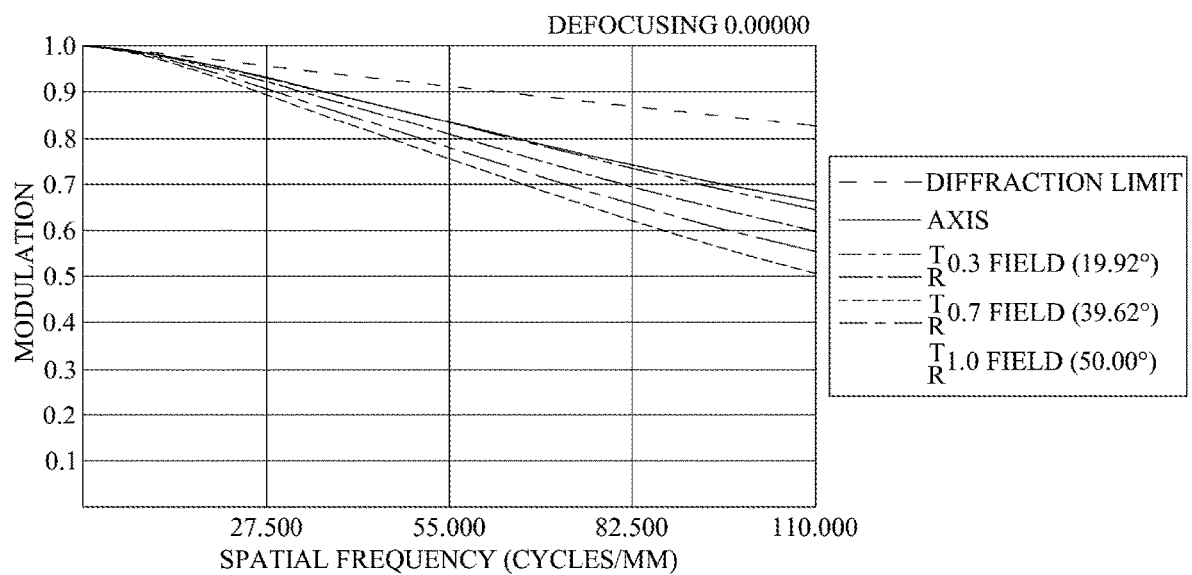
FIG. 1C is a characteristic diagram of modulation transfer of visible light spectrum for the optical image capturing system according to the first embodiment of the present invention.

Please refer to FIGS. 1A to 1C. FIG. 1A is a schematic view of the optical image capturing system according to the first embodiment of the present invention. FIG. 1B is a curve diagram illustrating the spherical aberration, astigmatism and optical distortion of the optical image capturing system in order from left to right according to the first embodiment of the present invention. FIG. 1C is a characteristic diagram of modulation transfer of visible light spectrum for the optical image capturing system according to the first embodiment of the present invention. As shown in FIG. 1A, an optical image capturing system is provided, which includes, in the order from the object side to the image side, a first lens 110, an aperture 100, a second lens 120, a third lens 130, a fourth lens 140, a fifth lens 150, a sixth lens 160, an IR-cut filter 180, an image plane 190, and an image sensor element 192.

The first lens 110 has negative refractive power and is made of plastic. The object side 112 of the first lens 110 is a concave surface and the image side 114 of the first lens 110 is a concave surface, and the object side 112 and the image side 114 of are aspheric. The object side 112 has two inflection points. The thickness of the first lens 110 on the optical axis is denoted by TP1. The thickness of the first lens 110 at a height of ½ entrance pupil diameter (HEP) is denoted by ETP1.

SGI111 denotes a distance parallel to the optical axis from the inflection point on the object side surface of the first lens which is the nearest to the optical axis to an axial point on the object side surface of the first lens. SGI121 denotes a distance parallel to an optical axis from an inflection point on the image side surface of the first lens which is the nearest to the optical axis to an axial point on the image side surface of the first lens. The following conditions are satisfied: SGI111=−0.0031 mm; |SGI111|/(|SGI111|+TP1)=0.0016.

SGI112 denotes the distance parallel to the optical axis from the inflection point on the object side surface of the first lens which is the second nearest to the optical axis to an axial point on the object side surface of the first lens. SGI122 denotes the distance parallel to an optical axis from an inflection point on the image side surface of the first lens which is the second nearest to the optical axis to an axial point on the image side surface of the first lens. The following conditions are satisfied: SGI112=1.3178 mm; |SGI112|/(|SGI112|+TP1)=0.4052.

HIF111 denotes the distance perpendicular to the optical axis between the inflection point on the object side surface of the first lens which is the nearest to the optical axis and the optical axis. HIF121 denotes the distance perpendicular to the optical axis between an axial point on the image side surface of the first lens and an inflection point on the image side surface of the first lens which is the nearest to the optical axis. The following conditions are satisfied: HIF111=0.5557 mm; HIF111/HOI=0.1111.

HIF112 denotes the distance perpendicular to the optical axis between the inflection point on the object side surface of the first lens which is the second nearest to the optical axis and the optical axis. HIF122 denotes the distance perpendicular to the optical axis between an axial point on the image side surface of the first lens and an inflection point on the image side surface of the first lens which is the second nearest to the optical axis. The following conditions are satisfied: HIF112=5.3732 mm; HIF112/HOI=1.0746.

The second lens 120 has positive refractive power and is made of plastic. The object side 122 of the second lens 120 is a convex surface and the image side 124 of the second lens 120 is a convex surface, and the object side 122 and the image side 124 are aspheric. The object side 122 has one inflection point. The thickness of the second lens 120 on the optical axis is TP2. The thickness of the second lens 120 at the height of ½ entrance pupil diameter (HEP) is denoted by ETP2.

The horizontal distance parallel to the optical axis from an inflection point on the object side of the second lens that is the first nearest to the optical axis to the intersection point where the object side of the second lens crosses the optical axis is denoted by SGI211. The horizontal distance parallel to the optical axis from an inflection point on the image side of the second lens that is the first nearest to the optical axis to the intersection point where the image side of the second lens crosses the optical axis is denoted by SGI221. The following conditions are satisfied: SGI211=0.1069 mm, |SGI211|/(|SGI211|+TP2)=0.0412, SGI221=0 mm and |SGI221|/(|SGI221|+TP2)=0.

The perpendicular distance from the inflection point on the object side of the second lens that is the first nearest to the optical axis to the optical axis is denoted by HIF211. The distance perpendicular to the optical axis from the inflection point on the image side of the second lens that is the first nearest to the optical axis to the intersection point where the image side of the second lens crosses the optical axis is denoted by HIF221. The following conditions are satisfied: HIF211=1.1264 mm, HIF211/HOI=0.2253, HIF221=0 mm and HIF221/HOI=0.

The third lens 130 has negative refractive power and is made of plastic. An object side 132 of the third lens 130 is a concave surface and an image side 134 of the third lens 130 is a convex surface, and the object side 132 and the image side 134 are both aspheric. The object side 132 has one inflection point, and the image side 134 has one inflection point. The thickness of the third lens 130 on the optical axis is TP3. The thickness of the third lens 130 at the height of ½ entrance pupil diameter (HEP) is denoted by ETP3.

The distance parallel to the optical axis from an inflection point on the object side of the third lens that is the first nearest to the optical axis to an intersection point where the object side of the third lens crosses the optical axis is denoted by SGI311. The distance parallel to the optical axis from an inflection point on the image side of the third lens that is the first nearest to the optical axis to an intersection point where the image side of the third lens crosses the optical axis is denoted by SGI321. The following conditions are satisfied: SGI311=−0.3041 mm, |SGI311|/(|SGI311|+TP3)=0.4445, SGI321=−0.1172 mm and |SGI321|/(|SGI321|+TP3)=0.2357.

The perpendicular distance between the inflection point on the object side of the third lens that is the first nearest to the optical axis and the optical axis is denoted by HIF311. The distance perpendicular to the optical axis between the inflection point on the image side of the third lens that is the first nearest to the optical axis and the intersection point where the image side of the third lens crosses the optical axis is denoted by HIF321. The following conditions are satisfied: HIF311=1.5907 mm, HIF311/HOI=0.3181, HIF321=1.3380 mm and HIF321/HOI=0.2676.

The fourth lens 140 has positive refractive power and is made of plastic. An object side 142 of the fourth lens 140 is a convex surface and an image side 144 of the fourth lens 140 is a concave surface, and the object side 142 and the image side 144 of the fourth lens 140 are both aspheric. The object side 142 has two inflection points, and the image side 144 has one inflection point. The thickness of the fourth lens on the optical axis is TP4. The thickness of the fourth lens at the height of ½ entrance pupil diameter (HEP) is denoted by ETP4.

The horizontal distance parallel to the optical axis from an inflection point on the object side of the fourth lens that is the first nearest to the optical axis to the intersection point where the object side of the fourth lens crosses the optical axis is denoted by SGI411. The horizontal distance parallel to the optical axis from an inflection point on the image side of the fourth lens that is the first nearest to the optical axis to the intersection point where the image side of the fourth lens crosses the optical axis is denoted by SGI421. The following conditions are satisfied: SGI411=0.0070 mm, |SGI411|/(SGI411|+TP4)=0.0056, SGI421=0.0006 mm and |SGI421|/(|SGI421|+TP4)=0.0005.

The horizontal distance parallel to the optical axis from an inflection point on the object side of the fourth lens that is the second nearest to the optical axis to the intersection point where the object side of the fourth lens crosses the optical axis is denoted by SGI412. The horizontal distance parallel to the optical axis from an inflection point on the image side of the fourth lens that is the second nearest to the optical axis to the intersection point where the image side of the fourth lens crosses the optical axis is denoted by SGI422. The following conditions are satisfied: SGI412=−0.2078 mm and |SGI412|/(|SGI412|+TP4)=0.1439

The perpendicular distance between the inflection point on the object side of the fourth lens that is the first nearest to the optical axis and the optical axis is denoted by HIF411. The distance perpendicular to the optical axis between the inflection point on the image side of the fourth lens that is the first nearest to the optical axis and the intersection point where the image side of the fourth lens crosses the optical axis is denoted by HIF421. The following conditions are satisfied: HIF411=0.4706 mm, HIF411/HOI=0.0941, HIF421=0.1721 mm and HIF421/HOI=0.0344.

The perpendicular distance between the inflection point on the object side of the fourth lens that is the second nearest to the optical axis and the optical axis is denoted by HIF412. The distance perpendicular to the optical axis between the inflection point on the image side of the fourth lens that is the second nearest to the optical axis and the intersection point where the image side of the fourth lens crosses the optical axis is denoted by HIF422. The following conditions are satisfied: HIF412=2.0421 mm and HIF412/HOI=0.4084.

The fifth lens 150 has positive refractive power and is made of plastic. An object side 152 of the fifth lens 150 is a convex surface and an image side 154 of the fifth lens 150 is a convex surface, and the object side 152 and the image side 154 are both aspheric. The object side 152 has two inflection points and the image side 154 has one inflection point. The thickness of the fifth lens on the optical axis is TP5. The thickness of the fifth lens at the height of ½ entrance pupil diameter (HEP) is denoted by ETP5.

The horizontal distance parallel to the optical axis from an inflection point on the object side of the fifth lens that is the first nearest to the optical axis to the intersection point where the object side of the fifth lens crosses the optical axis is denoted by SGI511. The horizontal distance parallel to the optical axis from an inflection point on the image side of the fifth lens that is the first nearest to the optical axis to the intersection point where the image side of the fifth lens crosses the optical axis is denoted by SGI521. The following conditions are satisfied: SGI511=0.00364 mm, |SGI511|/(|SGI511|+TP5)=0.00338, SGI521=−0.63365 mm and |SGI521|/(|SGI521|+TP5)=0.37154.

The horizontal distance parallel to the optical axis from an inflection point on the object side of the fifth lens that is the second nearest to the optical axis to the intersection point where the object side of the fifth lens crosses the optical axis is denoted by SGI512. The horizontal distance parallel to the optical axis from an inflection point on the image side of the fifth lens that is second nearest to the optical axis to the intersection point where the image side of the fifth lens crosses the optical axis is expressed as SGI522. The following conditions are satisfied: SGI512=−0.32032 mm and |SGI512|/(|SGI512|+TP5)=0.23009.

The horizontal distance parallel to the optical axis from an inflection point on the object side of the fifth lens that is the third nearest to the optical axis to the intersection point where the object side of the fifth lens crosses the optical axis is denoted by SGI513. The horizontal distance parallel to the optical axis from an inflection point on the image side of the fifth lens that is the third nearest to the optical axis to the intersection point where the image side of the fifth lens crosses the optical axis is denoted by SGI523. The following conditions are satisfied: SGI513=0 mm, |SGI513|/(SGI513|+TP5)=0, SGI523=0 mm and |SGI523|/(|SGI523|+TP5)=0.

The horizontal distance parallel to the optical axis from an inflection point on the object side of the fifth lens that is the fourth nearest to the optical axis to the intersection point where the object side of the fifth lens crosses the optical axis is denoted by SGI514. The horizontal distance parallel to the optical axis from an inflection point on the image side of the fifth lens that is the fourth nearest to the optical axis to the intersection point where the image side of the fifth lens crosses the optical axis is denoted by SGI524. The following conditions are satisfied: SGI514=0 mm, |SGI514|/(|SGI514|+TP5)=0, SGI524=0 mm and |SGI524|/(|SGI524|+TP5)=0.

The perpendicular distance between the optical axis and the inflection point on the object side of the fifth lens that is the first nearest to the optical axis is denoted by HIF511. The perpendicular distance between the optical axis and the inflection point on the image side of the fifth lens that is the first nearest to the optical axis is denoted by HIF521. The following conditions are satisfied: HIF511=0.28212 mm, HIF511/HOI=0.05642, HIF521=2.13850 mm and HIF521/HOI=0.42770.

The perpendicular distance between the inflection point on the object side of the fifth lens that is the second nearest to the optical axis and the optical axis is denoted by HIF512. The perpendicular distance between the inflection point on the image side of the fifth lens that is the second nearest to the optical axis and the optical axis is denoted by HIF522. The following conditions are satisfied: HIF512=2.51384 mm and HIF512/HOI=0.50277.

The perpendicular distance between the inflection point on the object side of the fifth lens that is the third nearest to the optical axis and the optical axis is denoted by HIF513. The perpendicular distance between the inflection point on the image side of the fifth lens that is the third nearest to the optical axis and the optical axis is denoted by HIF523. The following conditions are satisfied: HIF513=0 mm, HIF513/HOI=0, HIF523=0 mm and HIF523/HOI=0.

The perpendicular distance between the inflection point on the object side of the fifth lens that is the fourth nearest to the optical axis and the optical axis is denoted by HIF514. The perpendicular distance between the inflection point on the image side of the fifth lens that is the fourth nearest to the optical axis and the optical axis is denoted by HIF524. The following conditions are satisfied: HIF514=0 mm, HIF514/HOI=0, HIF524=0 mm and HIF524/HOI=0.

The sixth lens 160 has negative refractive power and is made of plastic. An object side 162 of the sixth lens 160 is a concave surface and an image side 164 of the sixth lens 160 is a concave surface. The object side 162 has two inflection points and the image side 164 has one inflection point. Hereby, the incident angle of each field of view on the sixth lens can be effectively adjusted and the spherical aberration can be improved.

The horizontal distance parallel to the optical axis from an inflection point on the object side of the sixth lens that is the first nearest to the optical axis to the intersection point where the object side of the sixth lens crosses the optical axis is denoted by SGI611. The horizontal distance parallel to the optical axis from an inflection point on the image side of the sixth lens that is the first nearest to the optical axis to the intersection point where the image side of the sixth lens crosses the optical axis is denoted by SGI621. The following conditions are satisfied: SGI611=−0.38558 mm, |SGI611|/(|SGI611|+TP6)=0.27212, SGI621=0.12386 mm and |SGI621|/(|SGI621|+TP6)=0.10722.

The horizontal distance parallel to the optical axis from an inflection point on the object side of the sixth lens that is the second nearest to the optical axis to an intersection point where the object side of the sixth lens crosses the optical axis is denoted by SGI612. The horizontal distance parallel to the optical axis from an inflection point on the image side of the sixth lens that is the second nearest to the optical axis to the intersection point where the image side of the sixth lens crosses the optical axis is denoted by SGI622. The following conditions are satisfied: SGI612=−0.47400 mm, |SGI612|/(|SGI612|+TP6)=0.31488, SGI622=0 mm and |SGI622|/(|SGI622|+TP6)=0.

The perpendicular distance between the inflection point on the object side of the sixth lens that is the first nearest to the optical axis and the optical axis is denoted by HIF611. The perpendicular distance between the inflection point on the image side of the sixth lens that is the first nearest to the optical axis and the optical axis is denoted by HIF621. The following conditions are satisfied: HIF611=2.24283 mm, HIF611/HOI=0.44857, HIF621=1.07376 mm and HIF621/HOI=0.21475.

The perpendicular distance between the inflection point on the object side of the sixth lens that is the second nearest to the optical axis and the optical axis is denoted by HIF612. The perpendicular distance between the inflection point on the image side of the sixth lens that is the second nearest to the optical axis and the optical axis is denoted by HIF622. The following conditions are satisfied: HIF612=2.48895 mm and HIF612/HOI=0.49779.

The perpendicular distance between the inflection point on the object side of the sixth lens that is the third nearest to the optical axis and the optical axis is denoted by HIF613. The perpendicular distance between the inflection point on the image side of the sixth lens that is the third nearest to the optical axis and the optical axis is denoted by HIF623. The following conditions are satisfied: HIF613=0 mm, HIF613/HOI=0, HIF623=0 mm and HIF623/HOI=0.

The perpendicular distance between the inflection point on the object side of the sixth lens that is fourth nearest to the optical axis and the optical axis is denoted by HIF614. The perpendicular distance between the inflection point on the image side of the sixth lens that is the fourth nearest to the optical axis and the optical axis is denoted by HIF624. The following conditions are satisfied: HIF614=0 mm, HIF614/HOI=0, HIF624=0 mm and HIF624/HOI=0.

In the first embodiment, the distance parallel to the optical axis between the coordinate point of the object side of the first lens at a height of ½ HEP and the image plane is denoted by ETL. The distance parallel to the optical axis between the coordinate point of the object side of the first lens at a height of ½ HEP and the coordinate point of the image side of the sixth lens at a height of ½ HEP is denoted by EIN. The following conditions may be satisfied: ETL=19.304 mm, EIN=15.733 mm and EIN/ETL=0.815.

The first embodiment satisfies the following conditions: ETP1=2.371 mm; ETP2=2.134 mm; ETP3=0.497 mm; ETP4=1.111 mm; ETP5=1.783 mm; ETP6=1.404 mm; the sum of ETP1 to ETP6 described above SETP=9.300 mm; TP1=2.064 mm; TP2=2.500 mm; TP3=0.380 mm; TP4=1.186 mm; TP5=2.184 mm, TP6=1.105 mm, the sum of TP1 to TP6 described above STP=9.419 mm; SETP/STP=0.987, and SETP/EIN=0.5911.

The first embodiment particularly controls the ratio relationship (ETP/TP) between the thickness (ETP) of each lens at a height of ½ entrance pupil diameter (HEP) and the thickness (TP) of the lens to which the surface belongs on the optical axis in order to achieve a balance between manufacturability and capability of aberration correction. The following relationships may be satisfied: ETP1/TP1=1.149, ETP2/TP2=0.854, ETP3/TP3=1.308, ETP4/TP4=0.936, ETP5/TP5=0.817 and ETP6/TP6=1.271.

The first embodiment controls the horizontal distance between each two adjacent lenses at a height of ½ entrance pupil diameter (HEP) to achieve a balance between the degree of miniaturization for the length of the optical image capturing system HOS, the manufacturability and the capability of aberration correction. The ratio relationship (ED/IN) of the horizontal distance (ED) between the two adjacent lens at the height of ½ entrance pupil diameter (HEP) to the horizontal distance (IN) on the optical axis between the two adjacent lens is particularly controlled. The following relationships are satisfied: the horizontal distance parallel to the optical axis between the first lens and the second lens at a height of ½ entrance pupil diameter (HEP) ED12=5.285 mm. The horizontal distance parallel to the optical axis between the second lens and the third lens at a height of ½ entrance pupil diameter (HEP) ED23=0.283 mm. The horizontal distance parallel to the optical axis between the third lens and the fourth lens at a height of ½ entrance pupil diameter (HEP) ED34=0.330 mm. The horizontal distance parallel to the optical axis between the fourth lens and the fifth lens at a height of ½ entrance pupil diameter (HEP) ED45=0.348 mm. The horizontal distance parallel to the optical axis between the fifth lens and the sixth lens at a height of ½ entrance pupil diameter (HEP) ED56=0.187 mm. The sum of ED12 to ED56 described above is expressed as SED, and SED=6.433 mm.

The horizontal distance on the optical axis between the first lens and the second lens IN12=5.470 mm and ED12/IN12=0.966. The horizontal distance on the optical axis between the second lens and the third lens IN23=0.178 mm and ED23/IN23=1.590. The horizontal distance on the optical axis between the third lens and the fourth lens IN34=0.259 mm and ED34/IN34=1.273. The horizontal distance on the optical axis between the fourth lens and the fifth lens IN45=0.209 mm and ED45/IN45=1.664. The horizontal distance on the optical axis between the fifth lens and the sixth lens IN56=0.034 mm and ED56/IN56=5.557. The sum of IN12 to IN56 described above is expressed as SIN and SIN=6.150 mm. SED/SIN=1.046.

The first embodiment satisfies the following conditions: ED12/ED23=18.685, ED23/ED34=0.857, ED34/ED45=0.947, ED45/ED56=1.859, IN12/IN23=30.746, IN23/IN34=0.686, IN34/IN45=1.239, and IN45/IN56=6.207.

The horizontal distance parallel to the optical axis between a coordinate point on the image side of the sixth lens at the height of ½ HEP and the image plane is denoted by EBL=3.570 mm. The horizontal distance parallel to the optical axis between an intersection point where the image side of the sixth lens crosses the optical axis and the image plane is denoted by BL=4.032 mm. The embodiment of the present invention may meet the following relationship: EBL/BL=0.8854. In the first embodiment, the distance parallel to the optical axis between the coordinate point on the image side of the sixth lens at the height of ½ HEP and the IR-cut filter is denoted by EIR=1.950 mm. The distance parallel to the optical axis between the intersection point where the image side of the sixth lens crosses the optical axis and the IR-cut filter is denoted by PIR=2.121 mm. The following relationship is satisfied: EIR/PIR=0.920.

The IR-cut filter 180 is made of glass, and disposed between the sixth lens 160 and the image plane 190, and does not affect the focal length of the optical image capturing system.

In the optical image capturing system of the first embodiment, the focal length of the optical image capturing system is denoted by f, the entrance pupil diameter of the optical image capturing system is denoted by HEP, and a half maximum angle of view of the optical image capturing system is denoted by HAF. The detailed parameters are shown as below: f=4.075 mm, f/HEP=1.4, HAF=50.001° and tan(HAF)=1.1918.

In the optical image capturing system of the first embodiment, the focal length of the first lens is denoted by f1 and the focal length of the sixth lens is denoted by f6. The following conditions are satisfied: f1=−7.828 mm, |f/f1|=0.52060, f6=−4.886 mm and |f1|>|f6|.

In the optical image capturing system of the first embodiment, focal lengths of the second lens to the fifth lens is denoted by f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f5|.

The ratio of the focal length f of the optical image capturing system to the focal length fp of each of lens with positive refractive power is denoted by PPR. The ratio of the focal length f of the optical image capturing system to a focal length fn of each of lens with negative refractive power is denoted by NPR. In the optical image capturing system of the first embodiment, the sum of the PPR of all lenses with positive refractive power is Σ PPR=f/f2+f/f4+f/f5=1.63290. The sum of the NPR of all lenses with negative refractive powers is ΣNPR=|f/f1|+|f/f3|+|f/f6|=1.51305, ΣPPR/|ΣNPR|=1.07921. Simultaneously, the following conditions are also satisfied: |f/f2|=0.69101, |f/f3|=0.15834, |f/f4|=0.06883, |f/f5|=0.87305 and |f/f6|=0.83412.

In the optical image capturing system of the first embodiment, the distance from the object side of the first lens to the image side of the sixth lens is denoted by InTL. The distance from the object side of the first lens to the image plane is denoted by HOS. The distance from the aperture to the image plane is denoted by InS. A half diagonal length of the effective detection field of the image sensing device is denoted by HOI. The distance from the image side of the sixth lens to the image plane is denoted by BFL. The following conditions are satisfied: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total thickness of all lenses with refractive power on the optical axis is denoted by ΣTP. The following conditions are satisfied: Σ TP=8.13899 mm and Σ TP/InTL=0.52477. Hereby, this configuration can keep the contrast ratio of the optical image capturing system and the yield rate about manufacturing lens at the same time, and provide the proper back focal length so as to accommodate other elements.

In the optical image capturing system of the first embodiment, the curvature radius of the object side of the first lens is denoted by R1. The curvature radius of the image side of the first lens is denoted by R2. The following condition is satisfied: |R1/R2|=8.99987. Hereby, the first lens has a suitable magnitude of positive refractive power, so as to prevent the longitudinal spherical aberration from increasing too fast.

In the optical image capturing system of the first embodiment, the curvature radius of the object side of the sixth lens is denoted by R11. The curvature radius of the image side of the sixth lens is denoted by R12. The following condition is satisfied: (R11−R12)/(R11+R12)=1.27780. Hereby, this configuration is beneficial for correcting the astigmatism generated by the optical image capturing system.

In the optical image capturing system of the first embodiment, the sum of focal lengths of all lenses with positive refractive power is denoted by ΣPP. The following conditions are satisfied: ΣPP=f2+f4+f5=69.770 mm and f5/(f2+f4+f5)=0.067. Hereby, this configuration is helpful to distribute the positive refractive power of a single lens to other lens with positive refractive powers in an appropriate way, so as to suppress the generation of noticeable aberrations in the propagating process of the incident light in the optical image capturing system.

In the optical image capturing system of the first embodiment, the sum of focal lengths of all lenses with negative refractive power is denoted by ΣNP. The following conditions are satisfied: ΣNP=f1+f3+f6=−38.451 mm and f6/(f1+f3+f6)=0.127. Hereby, this configuration is helpful to distribute the negative refractive power of the sixth lens to other lens with negative refractive powers in an appropriate way, so as to suppress the generation of noticeable aberrations in the propagating process of the incident light in the optical image capturing system.

In the optical image capturing system of the first embodiment, the distance on the optical axis between the first lens and the second lens is denoted by IN12. The following conditions are satisfied: IN12=6.418 mm and IN12/f=1.57491. Therefore, this configuration is helpful to improve the chromatic aberration of the lens in order to elevate the performance of the optical image capturing system of the first embodiment.

In the optical image capturing system of the first embodiment, a distance on the optical axis between the fifth lens and the sixth lens is denoted by IN56. The following conditions are satisfied: IN56=0.025 mm and IN56/f=0.00613. Therefore, this configuration is helpful to improve the chromatic aberration of the lens in order to elevate the performance of the optical image capturing system of the first embodiment.

In the optical image capturing system of the first embodiment, the thicknesses of the first lens and the second lens on the optical axis is denoted by TP1 and TP2, respectively. The following conditions are satisfied: TP1=1.934 mm, TP2=2.486 mm and (TP1+IN12)/TP2=3.36005. Therefore, this configuration is helpful to control the sensitivity generated by the optical image capturing system and elevate the performance of the optical image capturing system of the first embodiment.

In the optical image capturing system of the first embodiment, the thicknesses of the fifth lens 150 and the sixth lens 160 on the optical axis is denoted by TP5 and TP6, respectively, and the distance between the aforementioned two lenses on the optical axis is IN56. The following conditions are satisfied: TP5=1.072 mm, TP6=1.031 mm and (TP6+IN56)/TP5=0.98555. Therefore, this configuration is helpful to control the sensitivity generated by the optical image capturing system and reduce the total height of the optical image capturing system.

In the optical image capturing system of the first embodiment, the distance on the optical axis between the third lens 130 and the fourth lens 140 is denoted by IN34. The distance on the optical axis between the fourth lens 140 and the fifth lens 150 is denoted by IN45. The following conditions are satisfied: IN34=0.401 mm, IN45=0.025 mm and TP4/(IN34+TP4+IN45)=0.74376. Therefore, this configuration is helpful to slightly correct the aberration of the propagating process of the incident light layer by layer and decrease the total height of the optical image capturing system.

In the optical image capturing system of the first embodiment, a horizontal distance parallel to the optical axis from an intersection point where the object side 152 of the fifth lens crosses the optical axis to a maximum effective half diameter position on the object side 152 of the fifth lens is denoted by InRS51. The horizontal distance parallel to the optical axis from an intersection point where the image side 154 of the fifth lens crosses the optical axis to a maximum effective half diameter position on the image side 154 of the fifth lens is denoted by InRS52. The thickness of the fifth lens on the optical axis is denoted by TP5. The following conditions are satisfied: InRS51=−0.34789 mm, InRS52=−0.88185 mm, |InRS51|/TP5=0.32458 and |InRS52|/TP5=0.82276. Hereby, this configuration is favorable for manufacturing and forming of lens and keeps the miniaturization of the optical image capturing system effectively.

In the optical image capturing system of the first embodiment, the perpendicular distance between a critical point on the object side 152 of the fifth lens and the optical axis is denoted by HVT51. The perpendicular distance between a critical point on the image side 154 of the fifth lens and the optical axis is denoted by HVT52. The following conditions are satisfied: HVT51=0.515349 mm and HVT52=0 mm.

In the optical image capturing system of the first embodiment, a horizontal distance in parallel with the optical axis from an intersection point where the object side 162 of the sixth lens crosses the optical axis to a maximum effective half diameter position on the object side 162 of the sixth lens is denoted by InRS61. A distance parallel to the optical axis from an intersection point where the image side of the sixth lens crosses the optical axis to a maximum effective half diameter position on the image side 164 of the sixth lens is denoted by InRS62. The thickness of the sixth lens 160 is TP6. The following conditions are satisfied: InRS61=−0.58390 mm, InRS62=0.41976 mm, |InRS61|/TP6=0.56616 and |InRS62|/TP6=0.40700. Hereby, this configuration is favorable for manufacturing and forming of lens and keeps the miniaturization of the optical image capturing system effectively.

In the optical image capturing system of the first embodiment, the perpendicular distance between a critical point on the object side 162 of the sixth lens and the optical axis is denoted by HVT61. The perpendicular distance between a critical point on the image side 164 of the sixth lens and the optical axis is denoted by HVT62. The following conditions are satisfied: HVT61=0 mm and HVT62=0 mm.

In the optical image capturing system of the first embodiment, the following condition is satisfied: HVT51/HOI=0.1031. Therefore, this configuration is helpful to correct the aberration of surrounding field of view of the optical image capturing system.

In the optical image capturing system of the first embodiment, the following condition is satisfied: HVT51/HOS=0.02634. Therefore, this configuration is helpful to correct the aberration of surrounding field of view of the optical image capturing system.

In the optical image capturing system of the first embodiment, the second lens, the third lens and the sixth lens have negative refractive power. The coefficient of dispersion of the second lens is denoted by NA2. The coefficient of dispersion of the third lens is denoted by NA3. The coefficient of dispersion of the sixth lens is denoted by NA6. The following condition is satisfied: NA6/NA2≤1. Therefore, this configuration is helpful to correct the chromatic aberration of the optical image capturing system.

In the optical image capturing system of the first embodiment, TV distortion and optical distortion for image formation in the optical image capturing system is denoted by TDT and ODT, respectively. The following conditions are satisfied: TDT=2.124% and ODT=5.076%.

In the optical image capturing system 10 of the present embodiment, the modulation transfer rates (values of MTF) for the visible light at the spatial frequency of 55 cycles/mm at positions of the optical axis, 0.3 HOI and 0.7 HOI on the image plane are denoted as MTFE0, MTFE3 and MTFE7 respectively. The following conditions are satisfied: MTFE0 is about 0.84, MTFE3 is about 0.84 and MTFE7 is about 0.75. The modulation transfer rates (values of MTF) for the visible light at the spatial frequency of 110 cycles/mm at positions of the optical axis, 0.3 HOI and 0.7 HOI on the image plane 190 are respectively denoted as MTFQ0, MTFQ3 and MTFQ7. The following conditions are satisfied: MTFQ0 is about 0.66, MTFQ3 is about 0.65 and MTFQ7 is about 0.51. The modulation transfer rates (values of MTF) for the visible light at the spatial frequency of 220 cycles/mm at positions of the optical axis, 0.3 HOI and 0.7

HOI on the first image plane 190 are respectively denoted as MTFH0, MTFH3 and MTFH7. The following conditions are satisfied: MTFH0 is about 0.17, MTFH3 is about 0.07 and MTFH7 is about 0.14.

In the optical image capturing system 10 of the present embodiment, when the operation wavelength 850 nm focuses on the image plane, the modulation transfer rates (MTF values) with the spatial frequency of 55 cycles/mm where the images are at the optical axis, 0.3 field of view and 0.7 field of view are respectively expressed as MTFI0, MTFI3 and MTFI7. The following conditions are satisfied: MTFI0 is about 0.81, MTFI3 is about 0.8 and MTFI7 is about 0.15.

Please refer to Table 1 and Table 2

Table 1 is the detailed structure data to the first embodiment, wherein the unit of the curvature radius, the thickness, the distance, and the focal length is millimeters (mm). Surfaces 0-16 illustrate the surfaces from the object side to the image side. Table 2 is the aspheric coefficients of the first embodiment, wherein k is the conic coefficient in the aspheric surface formula. A1-A20 are aspheric surface coefficients from the first to the twentieth orders for each surface. In addition, the Table s for each of the embodiments as follows correspond to the schematic views and the aberration graphs for each of the embodiments. The definitions of data in the Table s are the same as those in Table 1 and Table 2 for the first embodiment. Therefore, similar description shall not be illustrated again. Furthermore, the definitions of

TABLE 1

Lens Parameters for the First Embodiment
f(Focal length) = 4.075 mm; f/HEP = 1.4; HAF(half angle of view) = 50.000 deg

| Surface | | Curvature Radius | Thickness (mm) | Material | Refractive index | Dispersion coefficient | Focal length |
|---|---|---|---|---|---|---|---|
| 0 | Object | Plano | Plano | | | | |
| 1 | Lens 1 | −40.99625704 | 1.934 | Plastic | 1.515 | 56.55 | −7.828 |
| 2 | | 4.555209289 | 5.923 | | | | |
| 3 | Aperture | Plano | 0.495 | | | | |
| 4 | Lens 2 | 5.333427366 | 2.486 | Plastic | 1.544 | 55.96 | 5.897 |
| 5 | | −6.781659971 | 0.502 | | | | |
| 6 | Lens 3 | −5.697794287 | 0.380 | Plastic | 1.642 | 22.46 | −25.738 |
| 7 | | −8.883957518 | 0.401 | | | | |
| 8 | Lens 4 | 13.19225664 | 1.236 | Plastic | 1.544 | 55.96 | 59.205 |
| 9 | | 21.55681832 | 0.025 | | | | |
| 10 | Lens 5 | 8.987806345 | 1.072 | Plastic | 1.515 | 56.55 | 4.668 |
| 11 | | −3.158875374 | 0.025 | | | | |
| 12 | Lens 6 | −29.46491425 | 1.031 | Plastic | 1.642 | 22.46 | −4.886 |
| 13 | | 3.593484273 | 2.412 | | | | |
| 14 | IR-cut filter | Plano | 0.200 | | 1.517 | 64.13 | |
| 15 | | Plano | 1.420 | | | | |
| 16 | Image plane | Plano | | | | | |

Reference wavelength = 555 nm; Shield position: The clear aperture of the first surface is 5.800 mm. The clear aperture of the third surface is 1.570 mm.
The clear aperture of the fifth surface is 1.950 mm.

Table two: coefficients of aspheric surfaces of first embodiment element parameters in each of the embodiments are the same as those in the first embodiment.

TABLE 2

| Aspheric Coefficients | | | | | | | |
|---|---|---|---|---|---|---|---|
| Surface | 1 | 2 | 4 | 5 | 6 | 7 | 8 |
| k | 4.310876E+01 | −4.707622E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| Surface | 9 | 10 | 11 | 12 | 13 |
|---|---|---|---|---|---|
| k | 6.200000E+01 | −2.114008E+01 | −7.699904E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478576E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

The Second Embodiment

Figure 2A:
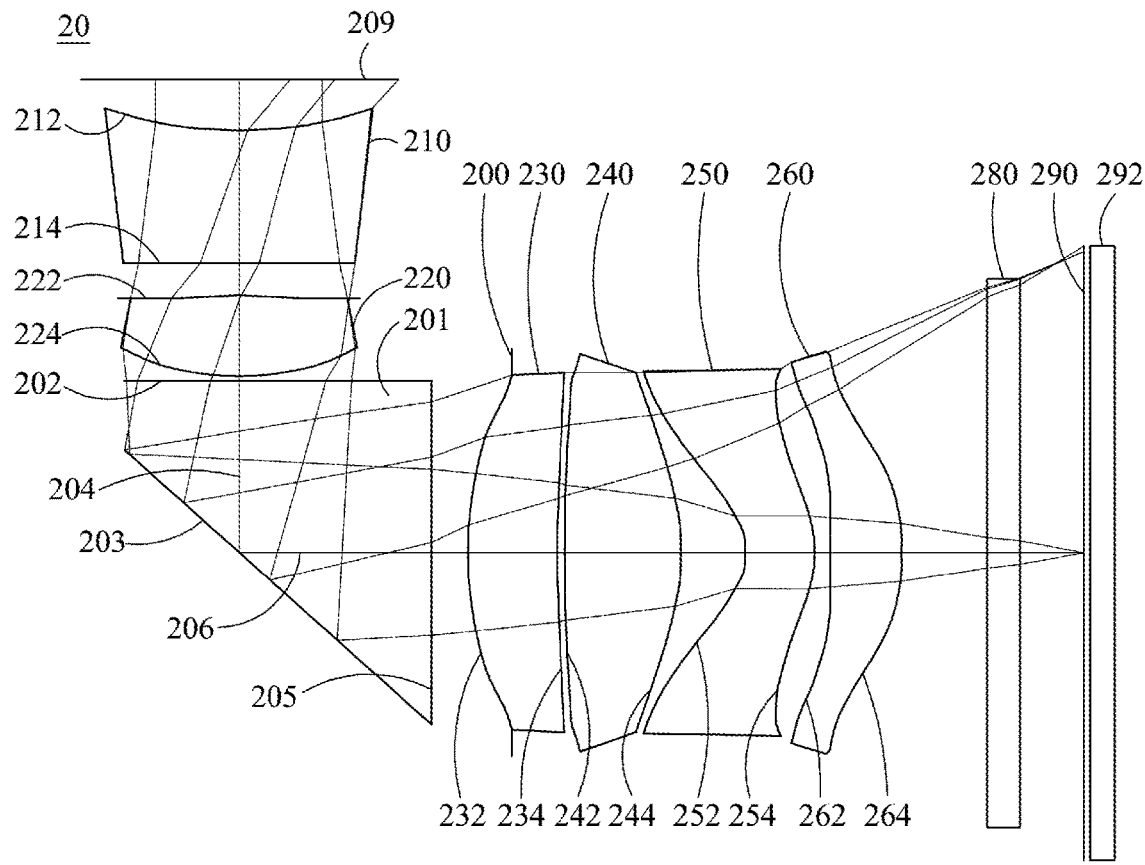
FIG. 2A is a schematic view of the optical image capturing system according to the second embodiment of the present invention.
Figure 2B:
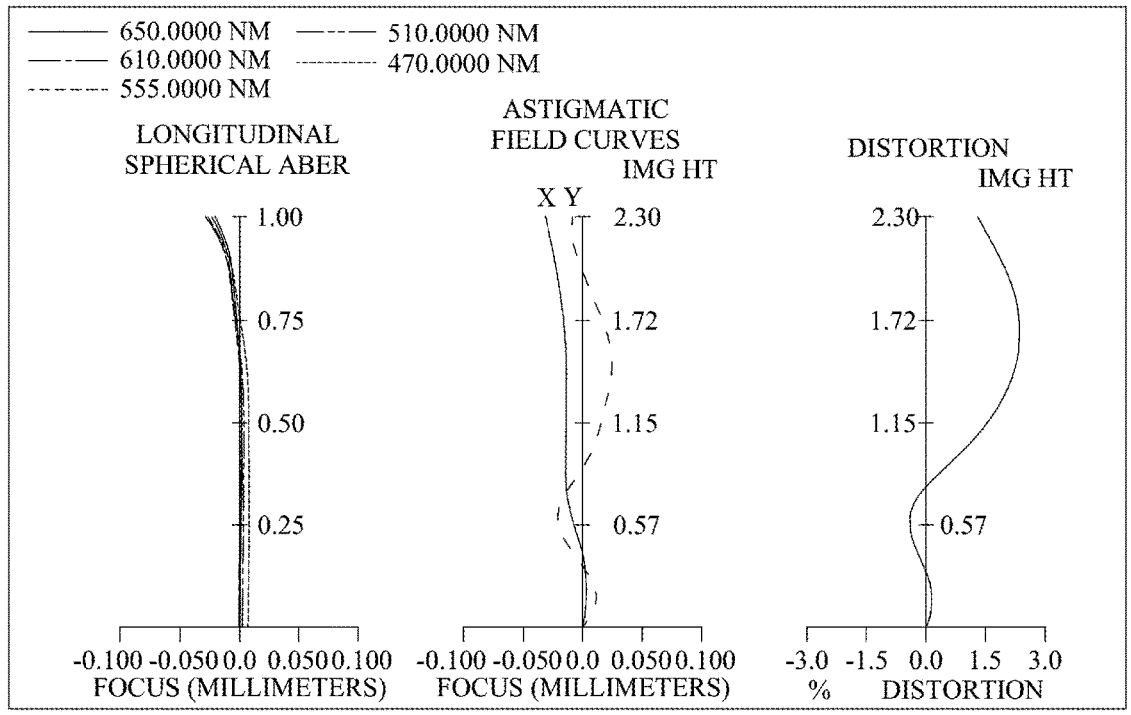
FIG. 2B is a curve diagram illustrating the spherical aberration, astigmatism and optical distortion of the optical image capturing system in order from left to right according to the second embodiment of the present invention.
Figure 2C:
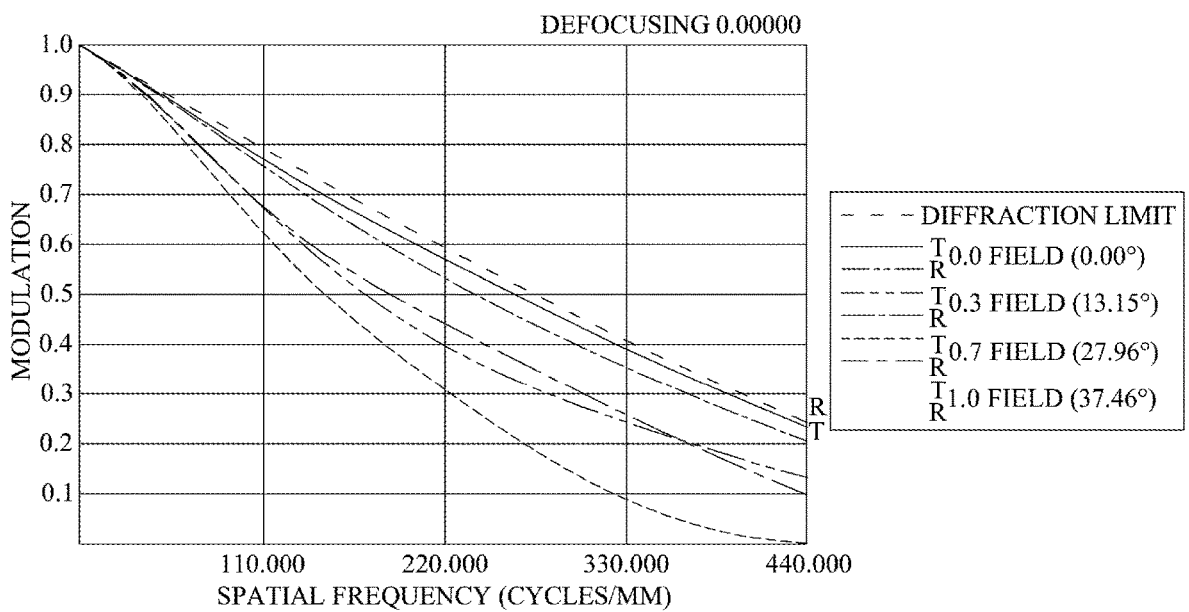
FIG. 2C is a characteristic diagram of modulation transfer of visible light spectrum for the optical image capturing system according to the second embodiment of the present invention.

Please refer to FIGS. 2A to 2C. FIG. 2A is a schematic view of the optical image capturing system according to the second embodiment of the present invention. FIG. 2B is a curve diagram illustrating the spherical aberration, astigmatism and optical distortion of the optical image capturing system in order from left to right according to the second embodiment of the present invention. FIG. 2C is a characteristic diagram of modulation transfer of visible light spectrum for the optical image capturing system according to the second embodiment of the present invention. As shown in FIG. 2A, An optical image capturing system is provided, which includes, in the order from the object side to the image side, a first lens 210, a second lens 220, a prism 201, an aperture 200, a third lens 230, a fourth lens 240, a fifth lens 250, a sixth lens 260, an IR-cut filter 280, an image plane 290, and an image sensor element 292.

In the electronic device mounted with the optical image capturing system of this embodiment, a mechanism light incident hole 209 can be formed on an object side, to limit the path of incident light on the object side. The mechanism light incident hole 209 has a diameter DDH=2.133 mm. A distance from the mechanism light incident hole 209 to a center, where the optical axis passes, of an object side surface of the first lens 210 is 0.375 mm. The reflective element can be the prism 201 and disposed between the second lens 220 and the third lens 230. The light of central field of view exits the second lens 220 to enter the incident surface 202 of the prism, and then bounce off a reflecting surface 203 of the prism, and these two light paths form an incident light path 204 (PT1). Next, the light of central field of view exits the reflecting surface 203 of the prism to bounce off a light exit surface 205 of the prism, and these two light paths form an exit light path 206 (PT2), and a thickness PT of the prism can be defined by a sum of the incident light path PT1 and the exit light path PT2, and PT=PT1+PT2=2.572 mm. The lengths of PT1 and PT2 are the same.

The first lens 210 has negative refractive power and is made of glass. The object side 212 of the first lens 210 is a convex surface and the image side 214 of the first lens 210 is a planar surface, and the object side 212 and the image side 214 are spherical.

The second lens 220 has positive refractive power and is made of plastic. The object side 222 of the second lens 220 is a convex surface and the image side 224 of the second lens 220 is a convex surface, and the object side 222 and the image side 224 are aspheric. The object side 222 has one inflection point.

The third lens 230 has positive refractive power and is made of plastic. An object side 232 of the third lens 230 is a convex surface and an image side 234 of the third lens is a concave surface, and the object side 232 and the image side 234 are both aspheric. The object side 232 has one inflection point.

The fourth lens 240 has positive refractive power and is made of plastic. An object side 242 of the fourth lens 240 is a convex surface and an image side 244 of the fourth lens 240 is a convex surface, and the object side 242 and the image side 244 of the fourth lens 240 are both aspheric. The object side 242 has two inflection points, and the image side 244 has one inflection point.

The fifth lens 250 has negative refractive power and is made of plastic. An object side 252 of the fifth lens 250 is a concave surface and an image side 254 of the fifth lens 250 is a convex surface, and the object side 252 and the image side 254 are both aspheric. The object side 252 has one inflection point and the image side 254 has one inflection point.

The sixth lens 260 has positive refractive power and is made of plastic. An object side 262 of the sixth lens 260 is a convex surface and an image side 264 of the sixth lens 260 is a convex surface, and the object side 262 and the image side 264 are both aspheric. The object side 232 has two inflection points and the image side 224 has one inflection point.

The IR-cut filter 280 is made of glass, and disposed between the sixth lens 260 and the image plane 290, and does not affect the focal length of the optical image capturing system.

Please refer to Table 3 and Table 4.

TABLE 3

Lens Parameters for the Second Embodiment
f(Focal length) = 2.960 mm; f/HEP = 2.60; HAF(half angle of view) = 37.242 deg

| Surface | | Curvature Radius | Thickness (mm) | Material | Refractive index | Dispersion coefficient | Focal length |
|---|---|---|---|---|---|---|---|
| 0 | Object | 1E+18 | 2000 | | | | |
| 1 | Lens 1 | −2.597402597 | 1.000 | Glass | 1.911 | 35.26 | −2.83626 |
| 2 | | 1E+18 | 0.248 | | | | |
| 3 | Lens 2 | 1E+18 | −0.008 | Plastic | | | |
| 4 | | 5.330243181 | 0.604 | | 1.535 | 55.80 | 2.45 |
| 5 | | −1.674750392 | 0.030 | | | | |
| 6 | Prism | 1E+18 | 2.572 | Glass | 2.001 | 25.44 | INF |
| 7 | Aperture | 1E+18 | 0.250 | | | | |
| 8 | Lens 3 | 3.910517902 | 0.598 | Plastic | 1.535 | 55.80 | 10.18 |
| 9 | | 13.01885817 | 0.050 | | | | |
| 10 | Lens 4 | 10.54145897 | 0.782 | Plastic | 1.535 | 55.80 | 3.30 |
| 11 | | −2.072042239 | 0.438 | | | | |
| 12 | Lens 5 | −0.462939867 | 0.458 | Plastic | 1.661 | 20.39 | −1.96538 |
| 13 | | −0.999163401 | 0.104 | | | | |
| 14 | Lens 6 | 6.491685014 | 0.489 | Plastic | 1.535 | 55.80 | 3.20936 |
| 15 | | −2.283209799 | 0.577 | | | | |
| 16 | IR-cut filter | 1E+18 | 0.210 | BK_7 | 1.517 | 64.13 | |

TABLE 3-continued

Lens Parameters for the Second Embodiment
f(Focal length) = 2.960 mm; f/HEP = 2.60; HAF(half angle of view) = 37.242 deg

| Surface | Curvature Radius | Thickness (mm) | Material | Refractive index | Dispersion coefficient | Focal length |
|---|---|---|---|---|---|---|
| 17 | | 1E+18 | 0.438 | | | |
| 18 | Image plane | 1E+18 | 0.000 | | | |

Reference wavelength = 555 nm; Shield position: The clear aperture of the seventh surface is 1.286 mm. The clear aperture of the tenth surface is 1.494 mm. The clear aperture of the fourteenth surface is 1.422 mm. The clear aperture of the fifteenth surface is 1.501 mm.

TABLE 4

Aspheric Coefficients

| Surface | 1 | 2 | 4 | 5 | 8 | 9 | 10 |
|---|---|---|---|---|---|---|---|
| k  | 0.000000E+00 | 0.000000E+00 | −9.114486E+01 | 1.544104E+00 | 1.733703E+00 | 4.064520E+01 | 4.133599E+01 |
| A4 | 0.000000E+00 | 0.000000E+00 | 3.223118E−02 | 5.395072E−02 | 3.269110E−02 | −1.797208E−03 | −1.416176E−03 |
| A6 | 0.000000E+00 | 0.000000E+00 | −1.565256E−01 | −1.289258E−02 | −2.109470E−03 | −1.691725E−02 | −3.321817E−02 |
| A8 | 0.000000E+00 | 0.000000E+00 | 1.585834E−01 | 1.964808E−02 | −2.688239E−03 | 1.145517E−02 | 1.450439E−02 |
| A10 | 0.000000E+00 | 0.000000E+00 | −1.725854E−01 | −1.779371E−02 | −3.903151E−04 | −2.249406E−03 | −5.159378E−04 |

| Surface | 11 | 12 | 13 | 14 | 15 |
|---|---|---|---|---|---|
| k  | −9.889533E+00 | −1.936349E+00 | −2.455257E+00 | 1.364118E+01 | −1.996946E+00 |
| A4 | −8.172352E−02 | 1.469856E−01 | 2.343976E−01 | −4.997522E−01 | −3.131254E−01 |
| A6 | 1.155855E−01 | −5.030610E−02 | −9.420419E−02 | 4.901576E−01 | 2.837742E−01 |
| A8 | −6.586687E−02 | 1.426986E−02 | −2.997763E−03 | −2.468734E−01 | −8.930753E−02 |
| A10 | 1.327300E−02 | −2.578291E−03 | 1.097607E−02 | 4.912982E−02 | 1.033880E−02 |

In the second embodiment, the aspheric surface formula is presented in the same way in the first embodiment. In addition, the definitions of parameters in following Table s are the same as those in the first embodiment. Therefore, similar description shall not be illustrated again.

The values stated as follows can be obtained according to Table 3 and Table 4.

| Second embodiment (Reference wavelength = 555 nm) | | | | | |
|---|---|---|---|---|---|
| MTFQ0 | MTFQ3 | MTFQ7 | MTFH0 | MTFH3 | MTFH7 |
| 0.78 | 0.68 | 0.63 | 0.58 | 0.4 | 0.32 |
| ETP1 | ETP2 | ETP3 | ETP4 | ETP5 | ETP6 |
| 1.063 | 0.480 | 0.565 | 0.694 | 0.593 | 0.407 |
| ETP1/TP1 | ETP2/TP2 | ETP3/TP3 | ETP4/TP4 | ETP5/TP5 | ETP6/TP6 |
| 1.063 | 0.795 | 0.944 | 0.887 | 1.295 | 0.833 |
| ETL | EBL | EIN | EIR | PIR | EIN/ETL |
| 8.905 | 1.319 | 7.586 | 0.671 | 0.577 | 0.852 |
| SETP/EIN | EIR/PIR | SETP | STP | SETP/STP | BL |
| 0.840 | 1.163 | 6.375 | 6.504 | 0.980 | 1.225 |
| ED12 | ED23 | ED34 | ED45 | ED56 | EBL/BL |
| 0.265 | 0.130 | 0.053 | 0.252 | 0.217 | 0.9287 |
| SED | SIN | SED/SIN | ED12/ED23 | ED23/ED34 | ED34/ED45 |
| 1.211 | 1.113 | 1.088 | 2.039 | 5.605 | 0.210 |
| ED12/IN12 | ED23/IN23 | ED34/IN34 | ED45/IN45 | ED56/IN56 | ED45/ED56 |
| 1.101 | 4.325 | 1.054 | 0.574 | 2.077 | 1.159 |
| \| f/f1 \| | \| f/f2 \| | \| f/f3 \| | \| f/f4 \| | \| f/f5 \| | \| f/f6 \| |
| 1.04369 | 1.20929 | 0.29079 | 0.89767 | 1.50617 | 0.92236 |
| ΣPPR | ΣNPR | ΣPPR/\|ΣNPR\| | IN12/f | IN56/f | TP4/(IN34 + TP4 + IN45) |
| 2.11082 | 3.75915 | 0.56151 | 0.08118 | 0.03529 | 0.61579 |
| \| f1/f2 \| | \| f2/f3 \| | (TP1 + IN12)/TP2 | | (TP6 + IN56)/TP5 | |
| 1.15866 | 0.24046 | 2.05474 | | 1.29457 | |
| HOS | InTL | HOS/HOI | InS/HOS | ODT % | TDT % |
| 8.84143 | 7.61648 | 3.87952 | 0.85880 | 2.44614 | 0.99985 |

-continued

| Second embodiment (Reference wavelength = 555 nm) | | | | | |
|---|---|---|---|---|---|
| HVT51 | HVT52 | HVT61 | HVT62 | HVT62/HOI | HVT62/HOS |
| 0 | 1.19305 | 0.29886 | 0.00000 | 0.00000 | 0.00000 |
| TP2/TP3 | TP3/TP4 | InRS61 | InRS62 | \| InRS61 \|/TP6 | \| InRS62 \|/TP6 |
| 1.00871 | 0.76487 | −0.25575 | −0.49424 | 0.52341 | 1.01150 |

The values stated as follows can be obtained according to Table 3 and Table 4.

| Values Related to Inflection Point of Second Embodiment (Primary Reference Wavelength = 555 nm) | | | | | | |
|---|---|---|---|---|---|---|
| HIF211 | 0.4697 | HIF211/HOI | 0.2061 | SGI211 | 0.0181 | \| SGI211 \|/(\| SGI211 \| + TP2) | 0.0292 |
| HIF311 | 1.2767 | HIF311/HOI | 0.5602 | SGI311 | 0.2806 | \| SGI311 \|/(\| SGI311 \| + TP3) | 0.3192 |
| HIF411 | 0.6459 | HIF411/HOI | 0.2834 | SGI411 | 0.0184 | \| SGI411 \|/(\| SGI411 \| + TP4) | 0.0230 |
| HIF412 | 1.0469 | HIF412/HOI | 0.4594 | SGI412 | 0.0336 | \| SGI412 \|/(\| SGI412 \| + TP4) | 0.0412 |
| HIF421 | 1.2718 | HIF421/HOI | 0.5580 | SGI421 | −0.2816 | \| SGI421 \|/(\| SGI421 \| + TP4) | 0.2646 |
| HIF511 | 0.6189 | HIF511/HOI | 0.2716 | SGI511 | −0.2950 | \| SGI511 \|/(\| SGI511 \| + TP5) | 0.3917 |
| HIF521 | 0.5424 | HIF521/HOI | 0.2380 | SGI521 | −0.1162 | \| SGI521 \|/(\| SGI521 \| + TP5) | 0.2024 |
| HIF611 | 0.1671 | HIF611/HOI | 0.0733 | SGI611 | 0.0018 | \| SGI611 \|/(\| SGI611 \| + TP6) | 0.0036 |
| HIF612 | 1.1973 | HIF612/HOI | 0.5254 | SGI612 | −0.1989 | \| SGI612 \|/(\| SGI612 \| + TP6) | 0.2893 |
| HIF621 | 0.9166 | HIF621/HOI | 0.4022 | SGI621 | −0.2700 | \| SGI621 \|/(\| SGI621 \| + TP6) | 0.3560 |

Third Embodiment

Figure 3A:
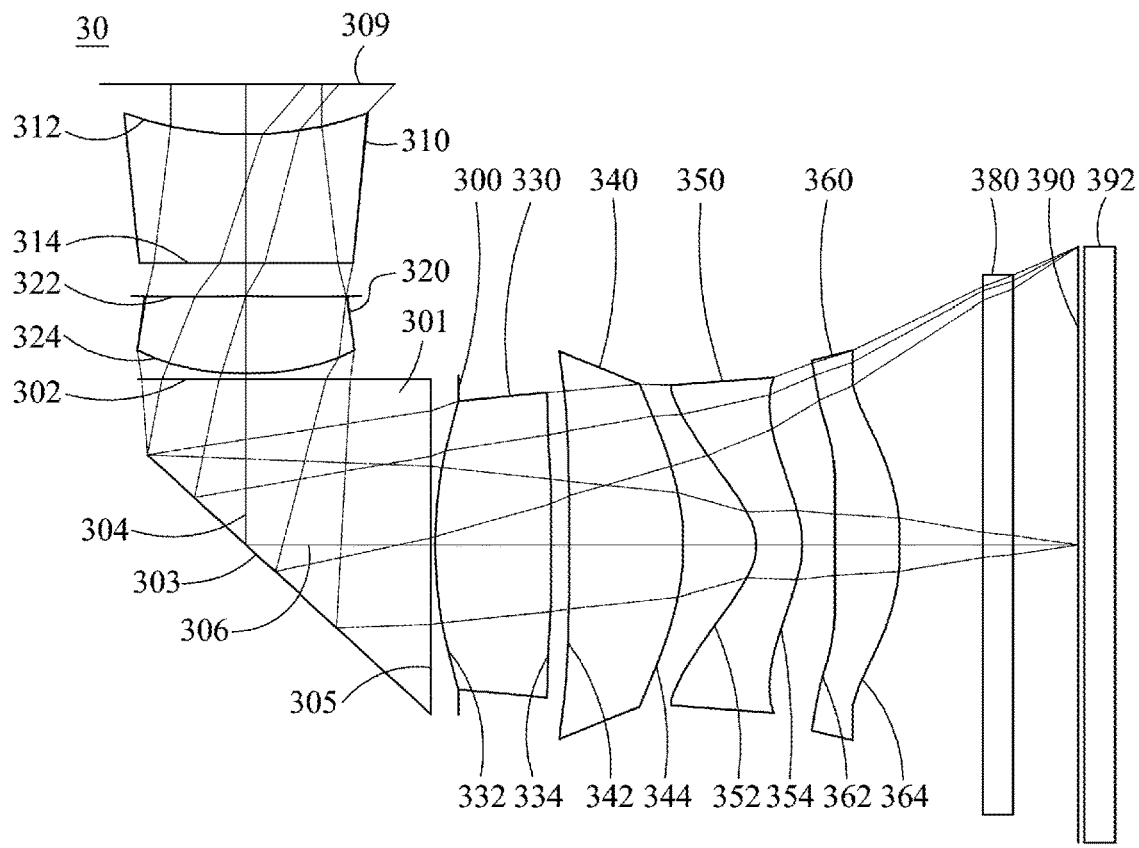
FIG. 3A is a schematic view of the optical image capturing system according to the third embodiment of the present invention.
Figure 3B:
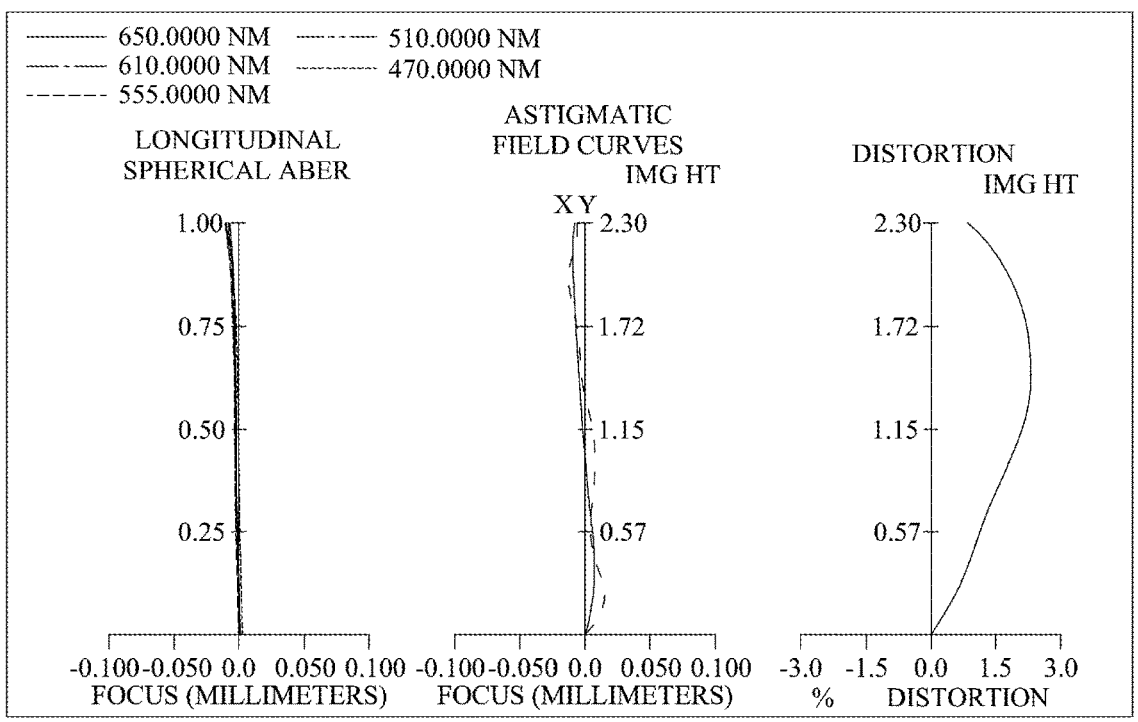
FIG. 3B is a curve diagram illustrating the spherical aberration, astigmatism and optical distortion of the optical image capturing system in order from left to right according to the third embodiment of the present invention.
Figure 3C:
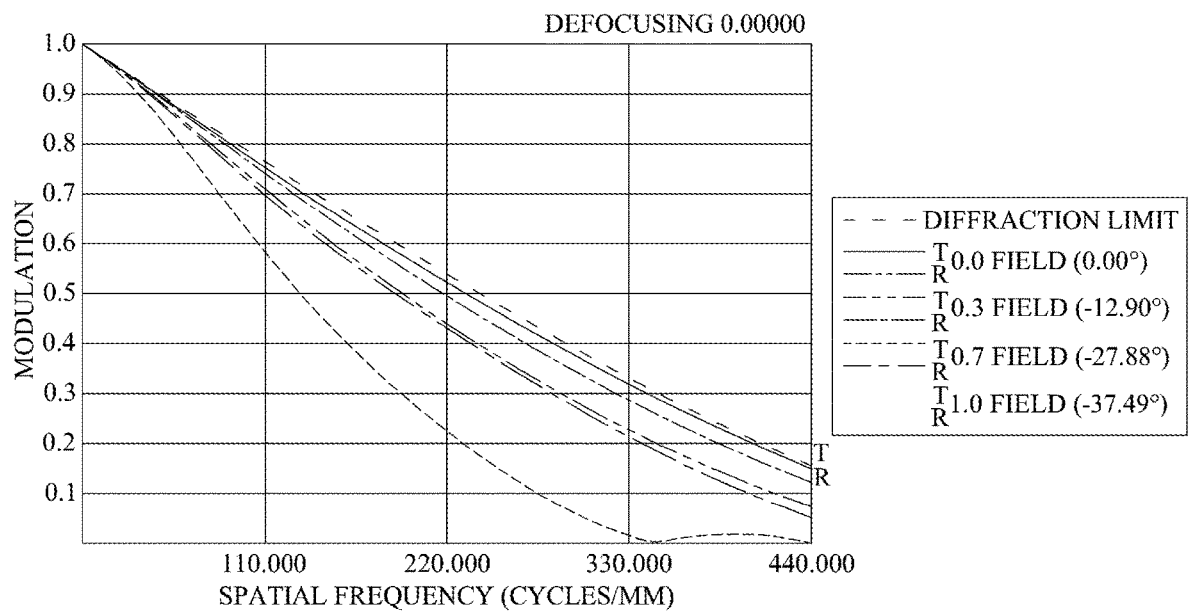
FIG. 3C is a characteristic diagram of modulation transfer of visible light spectrum for the optical image capturing system according to the third embodiment of the present invention.

Please refer to FIGS. 3A to 3C. FIG. 3A is a schematic view of the optical image capturing system according to the third embodiment of the present invention. FIG. 3B is a curve diagram illustrating the spherical aberration, astigmatism and optical distortion of the optical image capturing system in order from left to right according to the third embodiment of the present invention. FIG. 3C is a characteristic diagram of modulation transfer of visible light spectrum for the optical image capturing system according to the third embodiment of the present invention. As shown in FIG. 3A, an optical image capturing system is provided, which includes, in the order from the object side to the image side, a first lens 310, a second lens 320, a prism 301, an aperture 300, a third lens 330, a fourth lens 340, a fifth lens 350, and a sixth lens 360, an IR-cut filter 380, an image plane 390, and an image sensor element 392.

In the electronic device mounted with the optical image capturing system of this embodiment, a mechanism light incident hole 309 can be formed on an object side, to limit the path of incident light on the object side. The mechanism light incident hole 309 has a diameter DDH=2.042 mm. A distance from the mechanism light incident hole 309 to a center, where the optical axis passes, of an object side surface of the first lens 310 is 0.375 mm. The reflective element can be the prism 301 and disposed between the second lens 320 and the third lens 330. The light of central field of view exits the second lens 320 to enter the incident surface 202 of the prism, and then bounce off a reflecting surface 303 of the prism, and these two light paths form an incident light path 304 (PT1). Next, the light of central field of view exits the reflecting surface 303 of the prism to bounce off a light exit surface 305 of the prism, and these two light paths form an exit light path 306 (PT2), and a thickness PT of the prism can be defined by a sum of the incident light path PT1 and the exit light path PT2, and PT=PT1+PT2=2.572 mm. The lengths of PT1 and PT2 are the same.

The first lens 310 has negative refractive power and is made of glass. The object side 312 of the first lens 310 is a concave surface and the image side 314 of the first lens 310 is a planar surface.

The second lens 320 has positive refractive power and is made of plastic. The object side 322 of the second lens 320 is a convex surface and the image side 324 of the second lens 320 is a convex surface, and the object side 322 and the image side 324 are aspheric. The object side 322 has one inflection point.

The third lens 330 has positive refractive power and is made of plastic. An object side 332 of the third lens is a convex surface and an image side 334 of the third lens 330 is a convex surface, and the object side 332 and the image side 334 are both aspheric.

The fourth lens 340 has positive refractive power and is made of plastic. An object side 342 of the fourth lens 340 is a convex surface and an image side 344 of the fourth lens 340 is a convex surface, and the object side 342 and the image side 344 are both aspheric. The object side 342 has one inflection point.

The fifth lens 350 has negative refractive power and is made of plastic. An object side 352 of the fifth lens 350 is a concave surface and an image side 354 of the fifth lens is a convex surface, and the object side 352 and the image side 354 are both aspheric. The object side 352 has one inflection point and the image side 354 has one inflection point.

The sixth lens 360 has positive refractive power and is made of plastic. An object side 362 of the sixth lens 360 is a convex surface and an image side 364 of the sixth lens 360 is a convex surface, and the object side 362 and the image side 364 are both aspheric. The object side 362 has three inflection points and the image side 364 has two inflection points.

The IR-cut filter 380 is made of glass, and disposed between the sixth lens 360 and the image plane 390, and does not affect the focal length of the optical image capturing system.

Please refer to Table 5 and Table 6.

TABLE 5

Lens Parameters for the Third Embodiment
f(Focal length) = 2.9674 mm; f/HEP = 2.8; HAF(half angle of view) = 37.4715 deg

| Surface | | Curvature Radius | Thickness (mm) | Material | Refractive index | Dispersion coefficient | Focal length |
|---|---|---|---|---|---|---|---|
| 0 | Object | 1E+18 | 1E+18 | | | | |
| 1 | Lens 1 | −2.388202687 | 1.000 | Glass | 1.911 | 35.26 | −2.60788 |
| 2 | | 1E+18 | 0.248 | | | | |
| 3 | Lens 2 | 1E+18 | −0.008 | Plastic | 1.535 | 55.80 | 2.43 |
| 4 | | 6.115562716 | 0.604 | | | | |
| 5 | | −1.604485857 | 0.030 | | | | |
| 6 | Prism | 1E+18 | 2.572 | Glass | 2.001 | 25.44 | INF |
| 7 | Aperture | 1E+18 | 0.025 | | | | |
| 8 | Lens 3 | 4.534688086 | 0.800 | Plastic | 1.535 | 55.80 | 8.18 |
| 9 | | −131.7311765 | 0.124 | | | | |
| 10 | Lens 4 | 271.6735116 | 0.800 | Plastic | 1.535 | 55.80 | 3.80 |
| 11 | | −2.05338932 | 0.509 | | | | |
| 12 | Lens 5 | −0.424998887 | 0.321 | Plastic | 1.661 | 20.39 | −1.95793 |
| 13 | | −0.820247314 | 0.220 | | | | |
| 14 | Lens 6 | 5.462368934 | 0.450 | Plastic | 1.535 | 55.80 | 3.28189 |
| 15 | | −2.525243266 | 0.577 | | | | |
| 16 | IR-cut filter | 1E+18 | 0.210 | BK_7 | 1.517 | 64.13 | |
| 17 | | 1E+18 | 0.451 | | | | |
| 18 | Image plane | 1E+18 | 0.000 | | | | |

Reference wavelength = 555 nm; Shield position: The clear aperture of the seventh surface is 1.286 mm. The clear aperture of the tenth surface is 1.494 mm. The clear aperture of the fourteenth surface is 1.422 mm. The clear aperture of the fifteenth surface is 1.501 mm.

Table 6 coefficients of aspheric surfaces of third embodiment

TABLE 6

| Aspheric Coefficients | | | | | | | |
|---|---|---|---|---|---|---|---|
| Surface | 1 | 2 | 4 | 5 | 8 | 9 | 10 |
| k | 0.000000E+00 | 0.000000E+00 | −9.000000E+01 | −2.736283E−02 | 1.385335E+00 | 4.063433E+01 | 9.000000E+01 |
| A4 | 0.000000E+00 | 0.000000E+00 | 1.057841E−02 | 1.691937E−02 | 3.475294E−02 | −2.868982E−02 | −4.920108E−02 |
| A6 | 0.000000E+00 | 0.000000E+00 | −7.779708E−02 | 4.809838E−03 | −1.580358E−02 | −4.184400E−03 | −3.257860E−02 |
| A8 | 0.000000E+00 | 0.000000E+00 | −9.698799E−03 | −1.647726E−01 | −1.682619E−03 | 1.060870E−01 | 2.298395E−01 |
| A10 | 0.000000E+00 | 0.000000E+00 | 1.581232E−01 | 4.284364E−01 | 4.929896E−03 | −1.731094E−01 | −3.174755E−01 |
| A12 | 0.000000E+00 | 0.000000E+00 | −5.887676E−01 | −7.586177E−01 | −3.149587E−03 | 1.222336E−01 | 2.068708E−01 |
| A14 | 0.000000E+00 | 0.000000E+00 | 8.138575E−01 | 6.974319E−01 | 1.503405E−03 | −4.068644E−02 | −6.784277E−02 |
| A16 | 0.000000E+00 | 0.000000E+00 | −4.987143E−01 | −2.902426E−01 | −3.169665E−04 | 5.233515E−03 | 9.031656E−03 |

| Surface | 11 | 12 | 13 | 14 | 15 |
|---|---|---|---|---|---|
| k | −6.660329E+00 | −2.128705E+00 | −3.499340E+00 | 1.213656E+01 | −9.907847E+00 |
| A4 | −4.647069E−02 | 3.104600E−01 | 3.552591E−01 | −4.150067E−01 | −2.803845E−01 |
| A6 | −4.830342E−02 | −5.337833E−01 | −3.610137E−01 | 5.003350E−01 | 4.059364E−01 |
| A8 | 1.679018E−01 | 6.457077E−01 | 2.109597E−01 | −5.428899E−01 | −4.548954E−01 |
| A10 | −1.365477E−01 | −4.338215E−01 | −6.194904E−02 | 4.278132E−01 | 3.764073E−01 |
| A12 | 4.409297E−02 | 1.544671E−01 | 2.397321E−02 | −1.938613E−01 | −1.744585E−01 |
| A14 | −4.377639E−03 | −2.501921E−02 | −1.441423E−02 | 4.468013E−02 | 4.012420E−02 |
| A16 | −1.633579E−04 | 1.091350E−03 | 3.431675E−03 | −4.243721E−03 | −3.604513E−03 |

In the third embodiment, the aspheric surface formula is presented in the same way in the first embodiment. In addition, the definitions of parameters in following Tables are the same as those in the first embodiment. Therefore, similar description shall not be illustrated again.

The values stated as follows can be obtained according to Table 5 and Table 6.

| Third embodiment (Reference wavelength = 555 nm) | | | | | |
|---|---|---|---|---|---|
| MTFQ0 | MTFQ3 | MTFQ7 | MTFH0 | MTFH3 | MTFH7 |
| 0.76 | 0.72 | 0.58 | 0.52 | 0.44 | 0.23 |
| ETP1 | ETP2 | ETP3 | ETP4 | ETP5 | ETP6 |
| 1.000 | 0.604 | 0.800 | 0.800 | 0.321 | 0.450 |
| ETP1/TP1 | ETP2/TP2 | ETP3/TP3 | ETP4/TP4 | ETP5/TP5 | ETP6/TP6 |
| 1.000 | 1.000 | 1.000 | 1.000 | 1.000 | 1.000 |
| ETL | EBL | EIN | EIR | PIR | EIN/ETL |
| 7.766 | 0.072 | 7.694 | 0.577 | 0.577 | 0.991 |
| SETP/EIN | EIR/PIR | SETP | STP | SETP/STP | BL |
| 0.851 | 1.000 | 6.546 | 6.546 | 1.000 | 1.239 |
| ED12 | ED23 | ED34 | ED45 | ED56 | EBL/BL |
| 0.240 | 0.030 | 0.124 | 0.509 | 0.220 | 0.0581 |
| SED | SIN | SED/SIN | ED12/ED23 | ED23/ED34 | ED34/ED45 |
| E148 | 1.148 | 1.000 | 8.010 | 0.202 | 0.243 |
| ED12/IN12 | ED23/IN23 | ED34/IN34 | ED45/IN45 | ED56/IN56 | ED45/ED56 |
| 1.000 | 1.000 | 1.000 | 1.000 | 1.000 | 2.315 |
| \| f/f1 \| | \| f/f2 \| | \| f/f3 \| | \| f/f4 \| | \| f/f5 \| | \| f/f6 \| |
| 1.13786 | 1.21891 | 0.36258 | 0.78073 | 1.51558 | 0.90417 |
| ΣPPR | ΣNPR | ΣPPR/\|ΣNPR\| | IN12/f | IN56/f | TP4/(IN34 + TP4 + IN45) |
| 1.14332 | 3.62353 | 0.31553 | 0.08098 | 0.07407 | 0.55838 |
| \| f1/f2 \| | \| f2/f3 \| | (TP1 + IN12)/TP2 | | (TP6 + IN56)/TP5 | |
| 1.07123 | 0.29747 | 2.05474 | | 2.08919 | |
| HOS | InTL | HOS/HOI | InS/HOS | ODT % | TDT % |
| 8.93351 | 7.69428 | 3.88921 | 0.86026 | 2.53522 | 1.55140 |
| HVT51 | HVT52 | HVT61 | HVT62 | HVT62/HOI | HVT62/HOS |
| 0 | 1.09026 | 0.38096 | 0.00000 | 0.00000 | 0.00000 |
| TP2/TP3 | TP3/TP4 | InRS61 | InRS62 | \| InRS61 \|/TP6 | \| InRS62 \|/TP6 |
| 0.75454 | 1.00000 | −0.15360 | −0.33159 | 0.34143 | 0.73706 |

The values stated as follows can be obtained according to Table 5 and Table 6.

| Values Related to Inflection Point of Third Embodiment (Primary Reference Wavelength = 555 nm) | | | | | | | |
|---|---|---|---|---|---|---|---|
| HIF211 | 0.4721 | HIF211/HOI | 0.2055 | SGI211 | 0.0160 | \| SGI211 \|/(\| SGI211 \| + TP2) | 0.0258 |
| HIF411 | 0.0786 | HIF411/HOI | 0.0342 | SGI411 | 0.000009 | \| SGI411 \|/(\| SGI411 \| + TP4) | 0.0000 |
| HIF511 | 0.5955 | HIF511/HOI | 0.2593 | SGI511 | −0.27543 | \| SGI511 \|/(\| SGI511 \| + TP5) | 0.4621 |
| HIF521 | 0.4566 | HIF521/HOI | 0.1988 | SGI521 | −0.0964 | \| SGI521 \|/(\| SGI521 \| + TP5) | 0.2313 |
| HIF611 | 0.2071 | HIF611/HOI | 0.0902 | SGI611 | 0.0032 | \| SGI611 \|/(\| SGI611 \| + TP6) | 0.0071 |
| HIF612 | 0.9774 | HIF612/HOI | 0.4255 | SGI612 | −0.0729 | \| SGI612 \|/(\| SGI612 \| + TP6) | 0.1394 |
| HIF613 | 1.2816 | HIF613/HOI | 0.5580 | SGI613 | −0.1328 | \| SGI613 \|/(\| SGI613 \| + TP6) | 0.2280 |
| HIF621 | 0.8959 | HIF621/HOI | 0.3900 | SGI621 | −0.2022 | \| SGI621 \|/(\| SGI621 \| + TP6) | 0.3101 |
| HIF622 | 1.4042 | HIF622/HOI | 0.6113 | SGI622 | −0.3280 | \| SGI622 \|/(\| SGI622 \| + TP6) | 0.4217 |

Fourth Embodiment

Figure 4A:
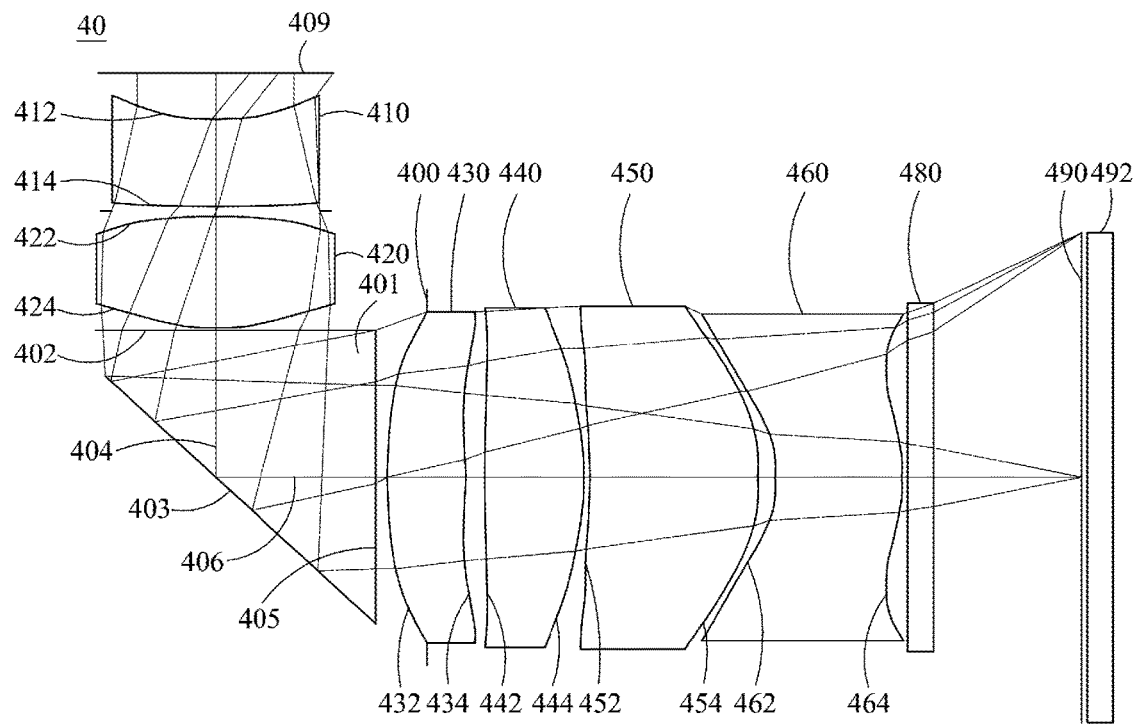
FIG. 4A is a schematic view of the optical image capturing system according to the fourth embodiment of the present invention.
Figure 4B:
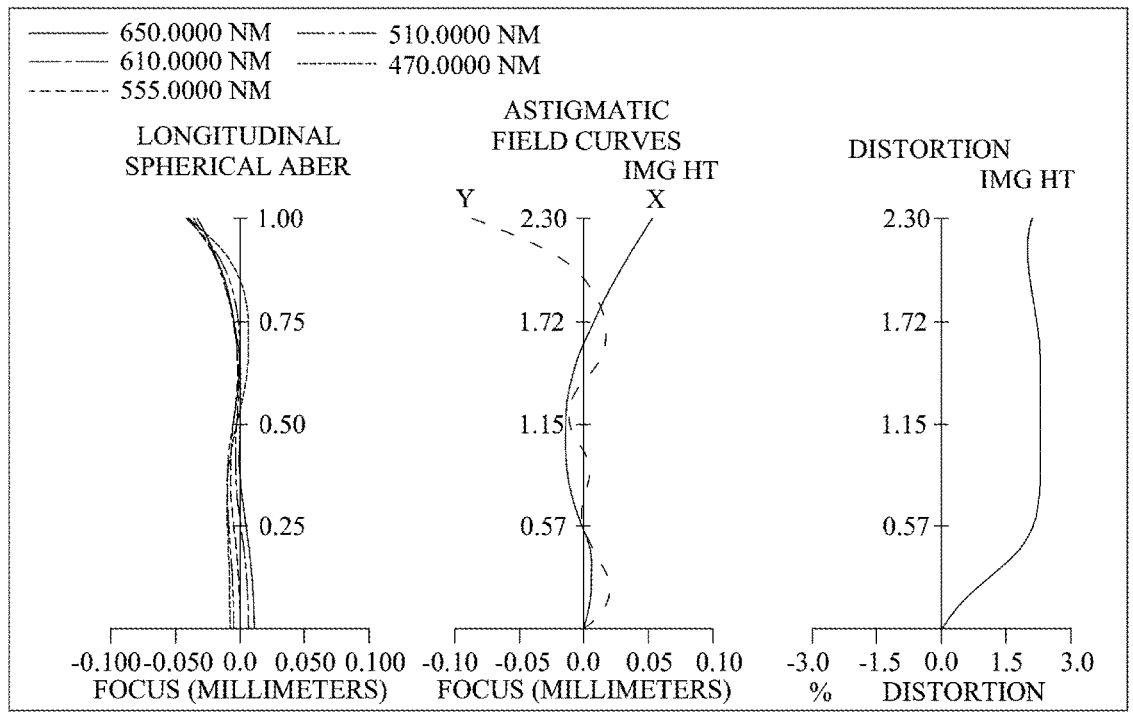
FIG. 4B is a curve diagram illustrating the spherical aberration, astigmatism and optical distortion of the optical image capturing system in order from left to right according to the fourth embodiment of the present invention.
Figure 4C:
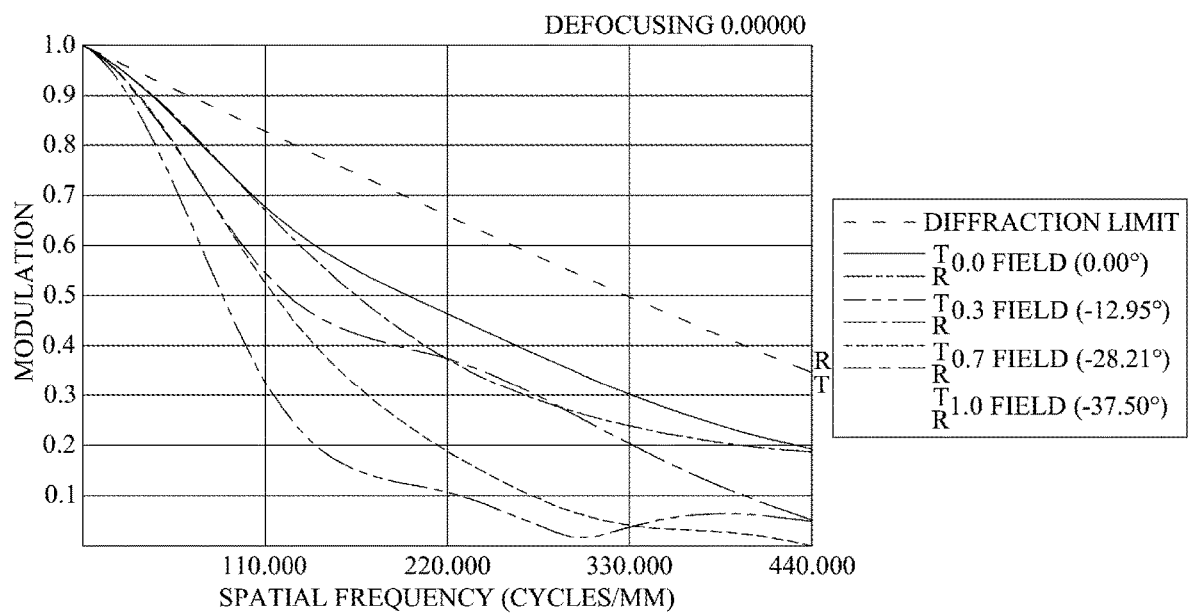
FIG. 4C is a characteristic diagram of modulation transfer of visible light spectrum for the optical image capturing system according to the fourth embodiment of the present invention.

Please refer to FIGS. 4A to 4C. FIG. 4A is a schematic view of the optical image capturing system according to the fourth embodiment of the present invention. FIG. 4B is a curve diagram illustrating the spherical aberration, astigmatism and optical distortion of the optical image capturing system in order from left to right according to the fourth embodiment of the present invention. FIG. 4C is a characteristic diagram of modulation transfer of visible light spectrum for the optical image capturing system according to the fourth embodiment of the present invention. As shown in FIG. 4A, An optical image capturing system is provided, which includes, in the order from the object side to the image side, a first lens 410, a second lens 420, a prism 401, an aperture 400, a third lens 430, a fourth lens 440, a fifth lens 450, a sixth lens 460, an IR-cut filter 480, an image plane 490, and an image sensor element 492.

In the electronic device mounted with the optical image capturing system of this embodiment, a mechanism light incident hole 409 can be formed on an object side, to limit the path of incident light on the object side. The mechanism light incident hole 409 has a diameter DDH=1.986 mm. A distance from the mechanism light incident hole 409 to a center, where the optical axis passes, of an object side of the first lens 410 is 0.422 mm. The reflective element can be the prism 401 and disposed between the second lens 420 and the third lens 430. The light of central field of view exits the second lens 420 to enter the incident surface 402 of the prism, and then bounce off a reflecting surface 403 of the prism, and these two light paths form an incident light path 404 (PT1). Next, the light of central field of view exits the reflecting surface of the prism to bounce off a light exit surface 405 of the prism, and these two light paths form an exit light path 406 (PT2), and a thickness PT of the prism can be defined by a sum of the incident light path PT1 and the exit light path PT2, and PT=PT1+PT2=2.700 mm. The lengths of PT1 and PT2 are the same.

The first lens 410 has negative refractive power and is made of glass. The object side 412 of the first lens 410 is a concave surface and the image side 414 of the first lens 410 is a convex surface, and the object side 412 and the image side 414 are aspheric.

The second lens 420 has positive refractive power and is made of glass. The object side 422 of the second lens 420 is a convex surface and the image side 424 of the second lens 420 is a convex surface, and the object side 422 and the image side 424 are aspheric. The image side 424 has one inflection point.

The third lens 430 has positive refractive power and is made of plastic. An object side 432 of the third lens 430 is a convex surface and an image side 434 of the third lens 430 is a convex surface, and the object side 432 and the image side 434 are both aspheric. The image side 434 has three inflection points.

The fourth lens 440 has positive refractive power and is made of plastic. An object side 442 of the fourth lens 440 is a concave surface and an image side 444 of the fourth lens 440 is a convex surface, and the object side 442 and the image side 444 are both aspheric. The object side 442 has four inflection points, and the image side 444 has one inflection point.

The fifth lens 450 has positive refractive power and is made of plastic. An object side 452 of the fifth lens 450 is a concave surface and an image side 454 of the fifth lens 450 is a convex surface, and the object side 452 and the image side 454 are both aspheric. The object side 452 has three inflection points and the image side 454 has two inflection points.

The sixth lens 460 has negative refractive power and is made of plastic. An object side 462 of the sixth lens 460 is a concave surface and an image side of the sixth lens 460 is a convex surface, and the object side 462 and the image side 464 are both aspheric. The object side 462 has two inflection points and the image side 464 has one inflection point.

The IR-cut filter 480 is made of glass, and disposed between the sixth lens 460 and the image plane 490, and does not affect the focal length of the optical image capturing system.

Please refer to Table 7 and Table 8

TABLE 7

Lens Parameters for the Fourth Embodiment
f(Focal length) = 2.740 mm; f/HEP = 2.210; HAF(half angle of view) = 37.399 deg

| Surface | | Curvature Radius | Thickness (mm) | Material | Refractive index | Dispersion coefficient | Focal length |
|---|---|---|---|---|---|---|---|
| 0 | Object | 1E+18 | 1E+18 | | | | |
| 1 | Lens 1 | −1.706645369 | 0.802 | Glass | 2.002 | 19.32 | −1.93897 |
| 2 | | −16.3093651 | 0.050 | | | | |
| 3 | Lens 2 | 1E+18 | 0.050 | Plastic | 1.584 | 29.89 | 2.3529 |
| 4 | | 5.776963432 | 1.033 | | | | |
| 5 | | −1.696668569 | 0.050 | | | | |
| 6 | Prism | 1E+18 | 2.700 | Glass | 1.773 | 49.62 | INF |
| 7 | Aperture | 1E+18 | 0.100 | | | | |
| 8 | Lens 3 | 18.48057666 | 0.645 | Plastic | 1.544 | 56.09 | 8.98363 |
| 9 | | −6.592910939 | 0.175 | | | | |
| 10 | Lens 4 | −291.4998429 | 0.829 | Plastic | 1.515 | 56.55 | 7.14168 |
| 11 | | −3.644449887 | 0.050 | | | | |
| 12 | Lens 5 | −6.195178277 | 1.421 | Plastic | 1.544 | 56.09 | 13.9426 |
| 13 | | −3.691848243 | 0.150 | | | | |
| 14 | Lens 6 | −1.572315354 | 1.063 | Plastic | 1.661 | 20.39 | −88.9574 |
| 15 | | −2.051903493 | 0.050 | | | | |
| 16 | IR-cut filter | 1E+18 | 0.215 | BK_7 | 1.517 | 64.13 | |
| 17 | | 1E+18 | 1.248 | | | | |
| 18 | Image plane | 1E+18 | 0.000 | | | | |

Reference wavelength = 555 nm; Shield position: The clear aperture of the eighth surface is 1.550 mm. The clear aperture of the tenth surface is 1.550 mm.

Table 8: coefficients of aspheric surfaces of fourth embodiment

TABLE 8

Aspheric Coefficients

| Surface | 1 | 2 | 4 | 5 | 8 | 9 | 10 |
|---|---|---|---|---|---|---|---|
| k | 0.000000E+00 | 0.000000E+00 | −3.215077E+01 | −1.703341E+00 | 3.313372E−08 | 9.374293E+00 | −3.864871E−08 |
| A4 | 0.000000E+00 | 0.000000E+00 | 7.386494E−02 | 2.345734E−02 | 1.273963E−01 | 2.673401E−01 | 1.704760E−01 |
| A6 | 0.000000E+00 | 0.000000E+00 | −2.687322E−02 | 5.685975E−03 | −1.010873E−01 | −4.289195E−01 | −4.954244E−01 |
| A8 | 0.000000E+00 | 0.000000E+00 | 1.148333E−01 | 7.202848E−02 | 7.402593E−02 | 4.797709E−01 | 6.362647E−01 |
| A10 | 0.000000E+00 | 0.000000E+00 | −1.726236E−01 | −1.698379E−01 | −3.811502E−02 | −3.164968E−01 | −4.334725E−01 |
| A12 | 0.000000E+00 | 0.000000E+00 | 1.613276E−01 | 2.439249E−01 | 1.201643E−02 | 1.217167E−01 | 1.652846E−01 |
| A14 | 0.000000E+00 | 0.000000E+00 | −7.821480E−02 | −1.672223E−01 | −2.230747E−03 | −2.621553E−02 | −3.399359E−02 |
| A16 | 0.000000E+00 | 0.000000E+00 | 1.464959E−02 | 4.858946E−02 | 2.078305E−04 | 2.487947E−03 | 2.973294E−03 |

| Surface | 11 | 12 | 13 | 14 | 15 |
|---|---|---|---|---|---|
| k | −5.564471E+01 | 8.274623E+00 | 3.210277E+00 | −1.415240E−01 | −7.741970E−01 |
| A4 | −1.546108E−01 | −2.241511E−02 | −4.921576E−01 | −3.732350E−01 | 1.069253E−01 |
| A6 | 2.704549E−01 | 2.716887E−01 | 9.687232E−01 | 9.332764E−01 | −2.642258E−02 |
| A8 | −2.939973E−01 | −3.520765E−01 | −1.091518E+00 | −1.041871E+00 | 3.171236E−02 |
| A10 | 1.968550E−01 | 2.181472E−01 | 7.403808E−01 | 7.087524E−01 | 2.433409E−03 |

TABLE 8-continued

| Aspheric Coefficients | | | | | |
|---|---|---|---|---|---|
| A12 | −8.355270E−02 | −7.829269E−02 | −2.921855E−01 | −2.834829E−01 | −1.288135E−02 |
| A14 | 2.039328E−02 | 1.620044E−02 | 6.170319E−02 | 6.079475E−02 | 4.776693E−03 |
| A16 | −2.106693E−03 | −1.485752E−03 | −5.376561E−03 | −5.340077E−03 | −5.418039E−04 |

In the fourth embodiment, the aspheric surface formula is presented in the same way in the first embodiment. In addition, the definitions of parameters in following Table s are the same as those in the first embodiment. Therefore, similar description shall not be illustrated again.

The values stated as follows can be obtained according to Table 7 and Table 8.

| Fourth embodiment (Reference wavelength = 587.5 nm) | | | | | |
|---|---|---|---|---|---|
| MTFQ0 | MTFQ3 | MTFQ7 | MTFH0 | MTFH3 | MTFH7 |
| 0.68 | 0.53 | 0.33 | 0.47 | 0.19 | 0.11 |
| ETP1 | ETP2 | ETP3 | ETP4 | ETP5 | ETP6 |
| 0.922 | 0.864 | 0.610 | 0.761 | 1.344 | 1.142 |
| ETP1/TP1 | ETP2/TP2 | ETP3/TP3 | ETP4/TP4 | ETP5/TP5 | ETP6/TP6 |
| 1.150 | 0.837 | 0.945 | 0.918 | 0.946 | 1.074 |
| ETL | EBL | EIN | EIR | PIR | EIN/ETL |
| 10.765 | 1.601 | 9.163 | 0.138 | 0.050 | 0.851 |
| SETP/EIN | EIR/PIR | SETP | STP | SETP/STP | BL |
| 0.910 | 2.759 | 8.343 | 8.492 | 0.982 | 1.646 |
| ED12 | ED23 | ED34 | ED45 | ED56 | EBL/BL |
| 0.162 | 0.170 | 0.189 | 0.082 | 0.088 | 0.9727 |
| SED | SIN | SED/SIN | ED12/ED23 | ED23/ED34 | ED34/ED45 |
| 0.821 | 0.625 | 1.312 | 0.957 | 0.689 | 2.291 |
| ED12/IN12 | ED23/IN23 | ED34/IN34 | ED45/IN45 | ED56/IN56 | ED45/ED56 |
| 1.624 | 3.392 | 1.076 | 1.646 | 0.584 | 0.939 |
| \| f/f1 \| | \| f/f2 \| | \| f/f3 \| | \| f/f4 \| | \| f/f5 \| | \| f/f6 \| |
| 1.41289 | 1.16433 | 0.30495 | 0.38360 | 0.19649 | 0.03080 |
| ΣPPR | ΣNPR | ΣPPR/\| ΣNPR \| | IN12/f | IN56/f | TP4/(IN34 + TP4 + IN45) |
| 1.84685 | 2.57723 | 0.71660 | 0.03650 | 0.05475 | 0.78631 |
| \| f1/f2 \| | \| f2/f3 \| | (TP1 + IN12)/TP2 | | (TP6 + IN56)/TP5 | |
| 0.82408 | 0.26191 | 0.87370 | | 0.85351 | |
| HOS | InTL | HOS/HOI | InS/HOS | ODT % | TDT % |
| 9.41354 | 7.76756 | 4.09819 | 0.90948 | 9.65768 | 4.01954 |
| HVT51 | HVT52 | HVT61 | HVT62 | HVT62/HOI | HVT62/HOS |
| 1.55424 | 0 | 0.00000 | 1.04679 | 0.45572 | 0.11120 |
| TP2/TP3 | TP3/TP4 | InRS61 | InRS62 | \| InRS61 \|/TP6 | \| InRS62 \|/TP6 |
| 1.60045 | 0.77856 | −0.64242 | 0.06135 | 0.60442 | 0.05772 |

The values stated as follows can be obtained according to Table 7 and Table 8.

| Values Related to Inflection Point of Fourth Embodiment (Primary Reference Wavelength = 555 nm) | | | | | | | |
|---|---|---|---|---|---|---|---|
| HIF221 | 0.7594 | HIF221/HOI | 0.3306 | SGI221 | −0.1523 | \| SGI221 \|/(\| SGI221 \| + TP2) | 0.1285 |
| HIF321 | 0.2487 | HIF321/HOI | 0.1083 | SGI321 | −0.0038 | \| SGI321 \|/(\| SGI321 \| + TP3) | 0.0058 |
| HIF322 | 1.2009 | HIF322/HOI | 0.5228 | SGI322 | 0.0510 | \| SGI322 \|/(\| SGI322 \| + TP3) | 0.0733 |
| HIF323 | 1.5284 | HIF323/HOI | 0.6654 | SGI323 | 0.0825 | \| SGI323 \|/(\| SGI323 \| + TP3) | 0.1134 |
| HIF411 | 0.0412 | HIF411/HOI | 0.0179 | SGI411 | −0.000002 | \| SGI411 \|/(\| SGI411 \| + TP4) | 0.0000 |
| HIF412 | 0.5044 | HIF412/HOI | 0.2196 | SGI412 | 0.0047 | \| SGI412 \|/(\| SGI412 \| + TP4) | 0.0056 |
| HIF413 | 0.8385 | HIF413/HOI | 0.3650 | SGI413 | 0.0091 | \| SGI413 \|/(\| SGI413 \| + TP4) | 0.0109 |
| HIF414 | 1.1480 | HIF414/HOI | 0.4998 | SGI414 | 0.0142 | \| SGI414 \|/(\| SGI414 \| + TP4) | 0.0169 |
| HIF421 | 1.3722 | HIF421/HOI | 0.5974 | SGI421 | −0.2547 | \| SGI421 \|/(\| SGI421 \| + TP4) | 0.2351 |
| HIF511 | 0.4775 | HIF511/HOI | 0.2079 | SGI511 | −0.0174 | \| SGI511 \|/(\| SGI511 \| + TP5) | 0.0121 |
| HIF512 | 0.9143 | HIF512/HOI | 0.3981 | SGI512 | −0.0336 | \| SGI512 \|/(\| SGI512 \| + TP5) | 0.0231 |
| HIF513 | 1.3675 | HIF513/HOI | 0.5953 | SGI513 | −0.0668 | \| SGI513 \|/(\| SGI513 \| + TP5) | 0.0449 |
| HIF521 | 1.4906 | HIF521/HOI | 0.6489 | SGI521 | −0.5527 | \| SGI521 \|/(\| SGI521 \| + TP5) | 0.2800 |
| HIF522 | 1.5706 | HIF522/HOI | 0.6837 | SGI522 | −0.6037 | \| SGI522 \|/(\| SGI522 \| + TP5) | 0.2982 |
| HIF611 | 0.9373 | HIF611/HOI | 0.4081 | SGI611 | −0.3174 | \| SGI611 \|/(\| SGI611 \| + TP6) | 0.2300 |
| HIF612 | 1.3503 | HIF612/HOI | 0.5878 | SGI612 | −0.533697 | \| SGI612 \|/(\| SGI612 \| + TP6) | 0.3343 |
| HIF621 | 0.6393 | HIF621/HOI | 0.2783 | SGI621 | −0.083224 | \| SGI621 \|/(\| SGI621 \| + TP6) | 0.0726 |

Fifth Embodiment

Figure 5A:
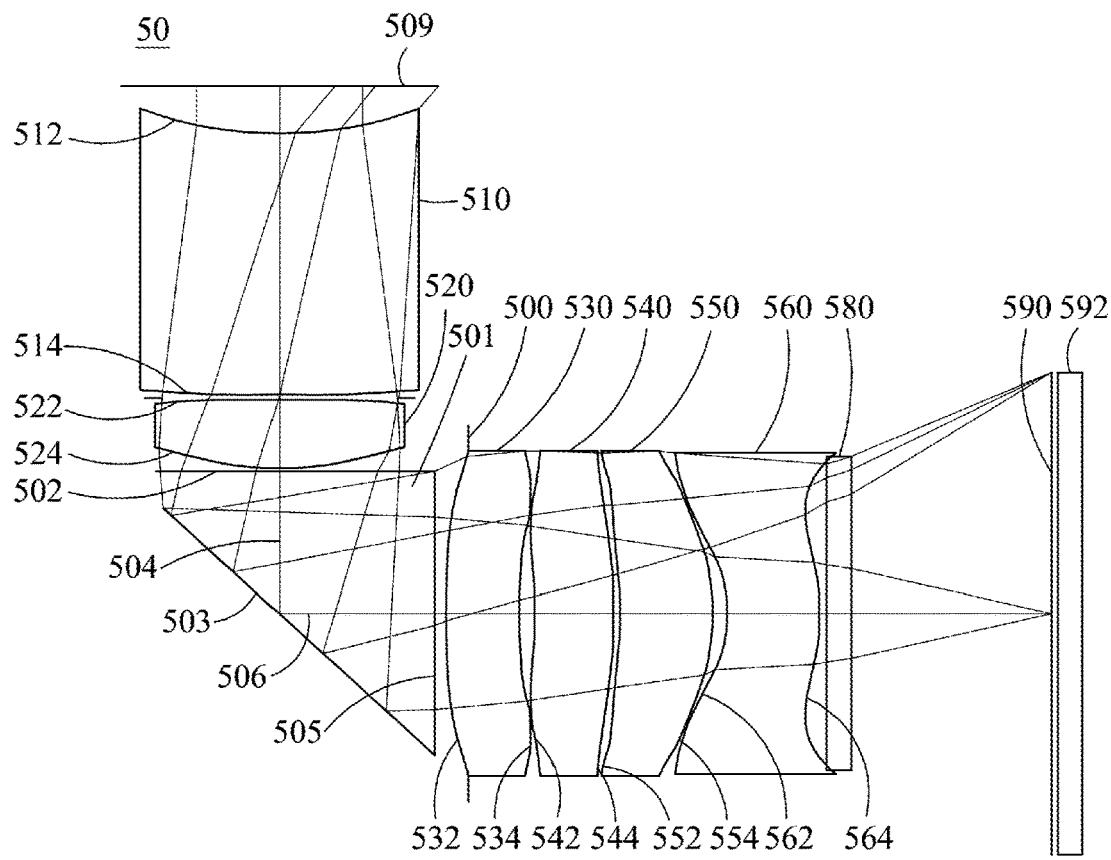
FIG. 5A is a schematic view of the optical image capturing system according to the fifth embodiment of the present invention.
Figure 5B:
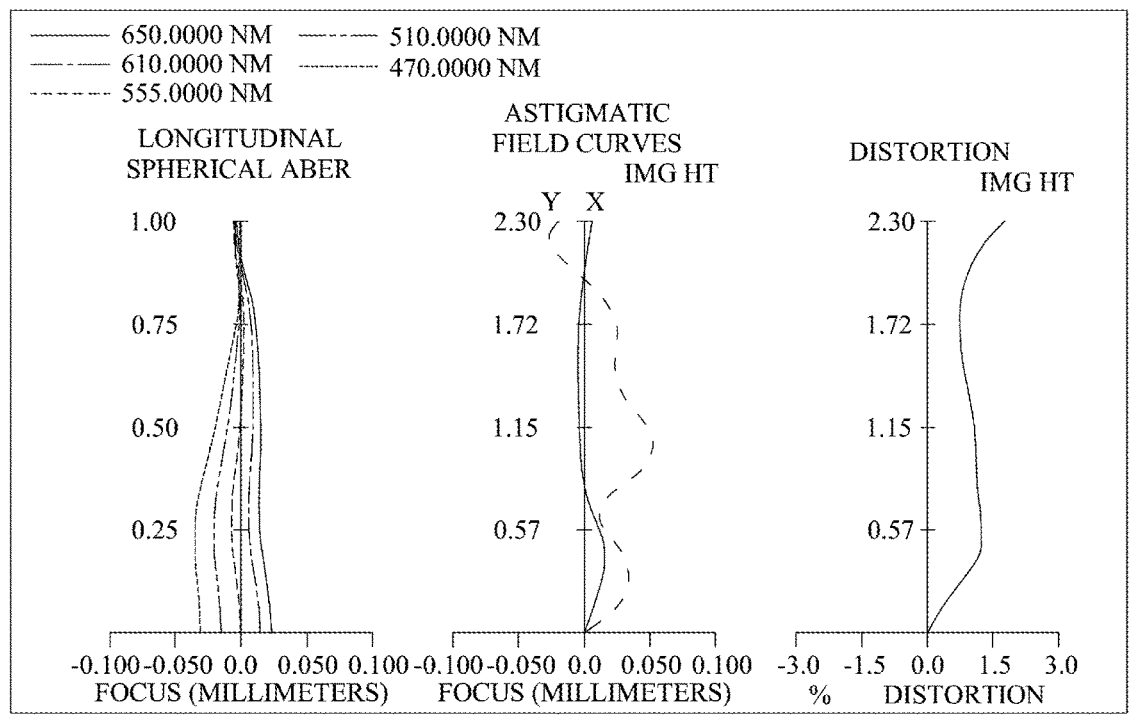
FIG. 5B is a curve diagram illustrating the spherical aberration, astigmatism and optical distortion of the optical image capturing system in order from left to right according to the fifth embodiment of the present invention.
Figure 5C:
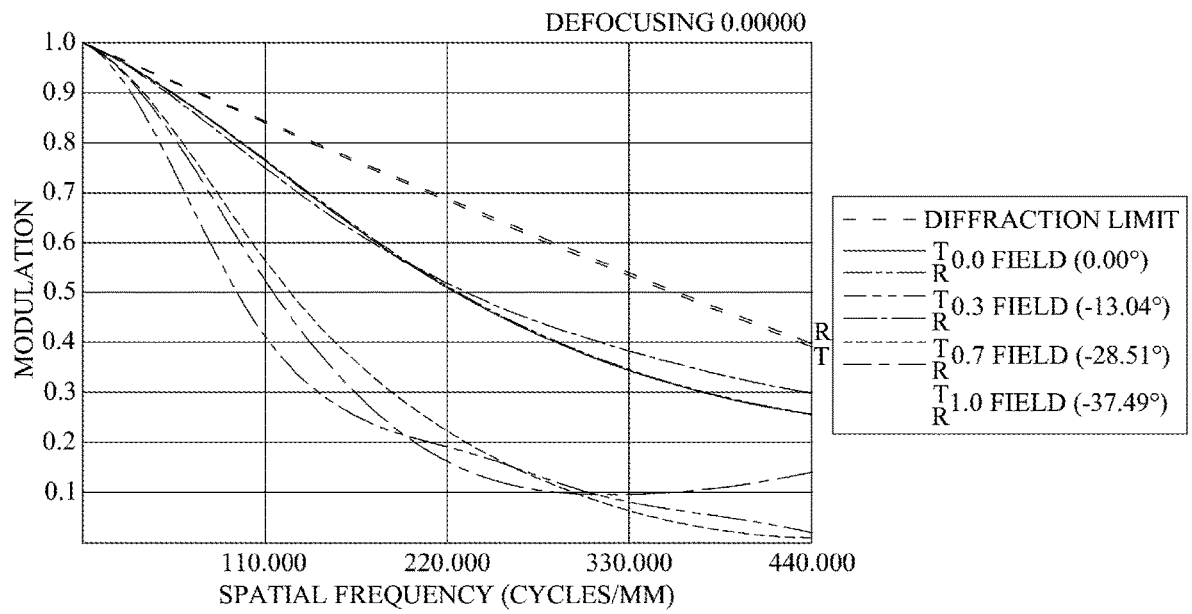
FIG. 5C is a characteristic diagram of modulation transfer of visible light spectrum for the optical image capturing system according to the fifth embodiment of the present invention.

Please refer to FIGS. 5A to 5C. FIG. 5A is a schematic view of the optical image capturing system according to the fifth embodiment of the present invention. FIG. 5B is a curve diagram illustrating the spherical aberration, astigmatism and optical distortion of the optical image capturing system in order from left to right according to the fifth embodiment of the present invention. FIG. 5C is a characteristic diagram of modulation transfer of visible light spectrum for the optical image capturing system according to the fifth embodiment of the present invention. As shown in FIG. 5A, an optical image capturing system is provided, which includes, in the order from the object side to the image side, a first lens 510, a second lens 520, a prism 501, and aperture 500, a third lens 530, a fourth lens 540, a fifth lens 550, a sixth lens 560, an IR-cut filter 580, an image plane 590, and an image sensor element 592.

In the electronic device mounted with the optical image capturing system of this embodiment, a mechanism light incident hole 509 can be formed on an object side, to limit the path of incident light on the object side. The mechanism light incident hole 509 has a diameter DDH=2.716 mm. A distance from the mechanism light incident hole 509 to a center, where the optical axis passes, of an object side surface of the first lens 510 is 0.444 mm. The reflective element can be the prism 501 and disposed between the second lens 520 and the third lens 530. The light of central field of view exits the second lens 520 to enter the incident surface 402 of the prism, and then bounce off a reflecting surface 503 of the prism, and these two light paths form an incident light path 504 (PT1). Next, the light of central field of view exits the reflecting surface 503 of the prism to bounce off a light exit surface 505 of the prism, and these two light paths form an exit light path 506 (PT2), and a thickness PT of the prism can be defined by a sum of the incident light path PT1 and the exit light path PT2, and PT=PT1+PT2=2.700 mm. The lengths of PT1 and PT2 are the same.

The first lens 510 has negative refractive power and is made of glass. The object side 512 of the first lens 510 is a concave surface and the image side 514 of the first lens 510 is a convex surface, and the object side 512 and the image side 514 are spherical.

The second lens 520 has positive refractive power and is made of plastic. The object side 522 of the second lens 520 is a concave surface and the image side 524 of the second lens 520 is a convex surface, and the object side 522 and the image side 524 are aspheric. The object side 232 has one inflection point, and the image side 224 has one inflection point.

The third lens 530 has positive refractive power and is made of plastic. An object side 532 of the third lens 530 is a convex surface and an image side 534 of the third lens 530 is a convex surface, and the object side 532 and the image side 534 are both aspheric. The object side 232 has one inflection point, and the image side 224 has two inflection points.

The fourth lens 540 has positive refractive power and is made of plastic. An object side 542 of the fourth lens 540 is a convex surface and an image side 544 of the fourth lens 540 is a convex surface, and the object side 542 and the image side 544 are both aspheric. The object side 542 has one inflection point, and the image side 544 has three inflection points.

The fifth lens 550 has negative refractive power and is made of plastic. An object side 552 of the fifth lens 550 is a concave surface and an image side 554 of the fifth lens 550 is a convex surface, and the object side 552 and the image side 554 are both aspheric. The object side 552 has three inflection points and the image side 554 has one inflection point.

The sixth lens 560 has negative refractive power and is made of plastic. An object side 562 of the sixth lens is a concave surface and an image side 564 of the sixth lens is a convex surface, and the object side 562 and the image side 564 are both aspheric. The object side 232 has one inflection point and the image side 224 has one inflection point.

The IR-cut filter 580 is made of glass, and disposed between the sixth lens 560 and the image plane 590, and does not affect the focal length of the optical image capturing system.

Please refer to Table 9 and Table 10

TABLE 9

Lens Parameters for the Fifth Embodiment
f(Focal length) = 2.761 mm; f/HEP = 2.0; HAF(half angle of view) = 39.993 deg

| Surface | | Curvature Radius | Thickness (mm) | Material | Refractive index | Dispersion coefficient | Focal length |
|---|---|---|---|---|---|---|---|
| 0 | Object | 1E+18 | 1E+18 | | | | |
| 1 | Lens 1 | −3.141559685 | 2.490 | Glass | 2.002 | 19.32 | −4.51716 |
| 2 | | −14.07741511 | 0.025 | | | | |
| 3 | Lens 2 | 10000 | 0.025 | Plastic | | | |
| 4 | | −56.85251541 | 0.648 | | 1.584 | 29.89 | 3.93968 |
| 5 | | −2.233124039 | 0.025 | | | | |
| 6 | Prism | 10000 | 2.700 | Glass | 1.773 | 49.62 | INF |
| 7 | Aperture | 10000 | 0.100 | | | | |
| 8 | Lens 3 | 39.98145881 | 0.761 | Plastic | 1.544 | 56.09 | 7.87273 |
| 9 | | −4.782707354 | −0.130 | | | | |
| 10 | Lens 4 | 6.380979398 | 0.800 | Plastic | 1.515 | 56.55 | 7.78981 |
| 11 | | −10.41205453 | 0.062 | | | | |
| 12 | Lens 5 | −4.802121617 | 0.800 | Plastic | 1.544 | 56.09 | −1052.55 |
| 13 | | −5.127469422 | 0.128 | | | | |
| 14 | Lens 6 | −1.630877563 | 0.800 | Plastic | 1.661 | 20.39 | −31.2699 |
| 15 | | −2.116458614 | 0.050 | | | | |
| 16 | IR-cut filter | 1E+18 | 0.215 | BK_7 | 1.517 | 64.13 | |
| 17 | | 1E+18 | 1.730 | | | | |
| 18 | Image plane | 1E+18 | 0.000 | | | | |

Reference wavelength = 555 nm; Shield position: The clear aperture of the eighth surface is 1.550 mm. The clear aperture of the ninth surface is 1.550 mm.

Table 10: coefficients of aspheric surfaces of the fifth embodiment

TABLE 10

| Aspheric Coefficients | | | | | | | |
|---|---|---|---|---|---|---|---|
| Surface | 1 | 2 | 4 | 5 | 8 | 9 | 10 |
| k | 0.000000E+00 | 0.000000E+00 | −3.215077E+01 | −7.636205E−01 | 3.878958E−08 | 7.124443E+00 | −1.227356E+00 |
| A4 | 0.000000E+00 | 0.000000E+00 | 2.149395E−02 | 2.766981E−02 | 3.788099E−02 | −5.745587E−03 | −1.919093E−02 |
| A6 | 0.000000E+00 | 0.000000E+00 | −1.444853E−02 | 2.919632E−02 | 3.440809E−02 | 3.517147E−01 | 1.628430E−01 |
| A8 | 0.000000E+00 | 0.000000E+00 | 7.420117E−02 | −6.423816E−02 | −5.403236E−02 | −4.710817E−01 | −2.061262E−01 |
| A10 | 0.000000E+00 | 0.000000E+00 | −1.221903E−01 | 1.048970E−01 | 3.743073E−02 | 2.871872E−01 | 9.931891E−02 |
| A12 | 0.000000E+00 | 0.000000E+00 | 1.185145E−01 | −9.062776E−02 | −1.639120E−02 | −9.049588E−02 | −1.333106E−02 |
| A14 | 0.000000E+00 | 0.000000E+00 | −5.880356E−02 | 4.322191E−02 | 4.358374E−03 | 1.355124E−02 | −3.859533E−03 |
| A16 | 0.000000E+00 | 0.000000E+00 | 1.184292E−02 | −8.363963E−03 | −5.327385E−04 | −6.567764E−04 | 9.971674E−04 |

| Surface | 11 | 12 | 13 | 14 | 15 |
|---|---|---|---|---|---|
| k | −5.564471E+01 | 7.106907E+00 | 5.276954E+00 | −2.049695E−01 | −1.436500E+00 |
| A4 | −1.008863E−02 | −4.663305E−02 | −6.102482E−01 | −4.791887E−01 | 6.815756E−02 |
| A6 | −2.399420E−01 | 2.024395E−01 | 1.161389E+00 | 1.189609E+00 | 1.686681E−03 |
| A8 | 5.312531E−01 | −1.490630E−01 | −1.073806E+00 | −1.191766E+00 | 1.331267E−01 |
| A10 | −4.972461E−01 | 4.726705E−02 | 5.600091E−01 | 6.979163E−01 | −1.798626E−01 |
| A12 | 2.426116E−01 | −1.171891E−02 | −1.678632E−01 | −2.433602E−01 | 1.148025E−01 |
| A14 | −6.158163E−02 | 2.908081E−03 | 2.639784E−02 | 4.668541E−02 | −3.714385E−02 |
| A16 | 6.537202E−03 | −2.247838E−04 | −1.562568E−03 | −3.734914E−03 | 4.805747E−03 |

In the fifth embodiment, the aspheric surface formula is presented in the same way in the first embodiment. In addition, the definitions of parameters in following Table s are the same as those in the first embodiment. Therefore, similar description shall not be illustrated again.

The values stated as follows can be obtained according to Table 9 and Table 10

| Fifth embodiment (Reference wavelength = 587.5 nm) | | | | | |
|---|---|---|---|---|---|
| MTFQ0 | MTFQ3 | MTFQ7 | MTFH0 | MTFH3 | MTFH7 |
| 0.76 | 0.56 | 0.42 | 0.5 | 0.23 | 0.19 |
| ETP1 | ETP2 | ETP3 | ETP4 | ETP5 | ETP6 |
| 2.557 | 0.534 | 0.706 | 0.714 | 0.733 | 0.880 |
| ETP1/TP1 | ETP2/TP2 | ETP3/TP3 | ETP4/TP4 | ETP5/TP5 | ETP6/TP6 |
| 1.027 | 0.825 | 0.928 | 0.892 | 0.916 | 1.100 |
| ETL | EBL | EIN | EIR | PIR | EIN/ETL |
| 11.316 | 2.116 | 9.200 | 0.170 | 0.050 | 0.813 |
| SETP/EIN | EIR/PIR | SETP | STP | SETP/STP | BL |
| 0.959 | 3.394 | 8.824 | 8.998 | 0.981 | 2.154 |
| ED12 | ED23 | ED34 | ED45 | ED56 | EBL/BL |
| 0.072 | 0.136 | 0.047 | 0.048 | 0.047 | 0.9824 |
| SED | SIN | SED/SIN | ED12/ED23 | ED23/ED34 | ED34/ED45 |
| 0.376 | 0.235 | 1.599 | 0.526 | 2.564 | 0.974 |
| ED12/IN12 | ED23/IN23 | ED34/IN34 | ED45/IN45 | ED56/IN56 | ED45/ED56 |
| 1.423 | 5.447 | 0.359 | 0.772 | 0.368 | 1.021 |
| \| f/f1 \| | \| f/f2 \| | \| f/f3 \| | \| f/f4 \| | \| f/f5 \| | \| f/f6 \| |
| 0.61114 | 0.70072 | 0.35065 | 0.35439 | 0.00262 | 0.08828 |
| ΣPPR | ΣNPR | ΣPPR/\|ΣNPR\| | IN12/f | IN56/f | TP4/(IN34 + TP4 + IN45) |
| 0.79332 | 1.31448 | 0.60353 | 0.01823 | 0.04634 | 1.09305 |
| \| f1/f2 \| | \| f2/f3 \| | (TP1 + IN12)/TP2 | | (TP6 + IN56)/TP5 | |
| 1.14658 | 0.50042 | 3.92176 | | 1.15992 | |
| HOS | InTL | HOS/HOI | InS/HOS | ODT % | TDT % |
| 10.03670 | 7.88303 | 4.36948 | 0.74945 | 1.32601 | 1.25150 |
| HVT51 | HVT52 | HVT61 | HVT62 | HVT62/HOI | HVT62/HOS |
| 1.51902 | 0 | 1.51464 | 0.97327 | 0.42372 | 0.09697 |
| TP2/TP3 | TP3/TP4 | InRS61 | InRS62 | \|InRS61\|/TP6 | \|InRS62\|/IP6 |
| 0.85150 | 0.95076 | −0.44509 | 0.07109 | 0.55636 | 0.08886 |

The values stated as follows can be obtained according to Table 9 and Table 10

Values Related to Inflection Point of Fifth Embodiment
(Primary Reference Wavelength = 555 nm)

| | | | | | | | |
|---|---|---|---|---|---|---|---|
| HIF211 | 0.2680 | HIF211/HOI | 0.1167 | SGI211 | −0.0005 | \| SGI211 \|/(\| SGI211 \| + TP2) | 0.0008 |
| HIF221 | 0.8507 | HIF221/HOI | 0.3704 | SGI221 | −0.1439 | \| SGI221 \|/(\| SGI221 \| + TP2) | 0.1817 |
| HIF311 | 1.3987 | HIF311/HOI | 0.6089 | SGI311 | 0.1530 | \| SGI311 \|/(\| SGI311 \| + TP3) | 0.1675 |
| HIF321 | 0.4463 | HIF321/HOI | 0.1943 | SGI321 | −0.0193 | \| SGI321 \|/(\| SGI321 \| + TP3) | 0.0248 |
| HIF322 | 0.9580 | HIF322/HOI | 0.4171 | SGI322 | −0.0325 | \| SGI322 \|/(\| SGI322 \| + TP3) | 0.0410 |
| HIF411 | 0.9878 | HIF411/HOI | 0.4300 | SGI411 | 0.0964 | \| SGI411 \|/(\| SGI411 \| + TP4) | 0.1076 |
| HIF421 | 0.8587 | HIF421/HOI | 0.3738 | SGI421 | −0.0534 | \| SGI421 \|/(\| SGI421 \| + TP4) | 0.0625 |
| HIF422 | 1.0144 | HIF422/HOI | 0.4416 | SGI422 | −0.0734 | \| SGI422 \|/(\| SGI422 \| + TP4) | 0.0841 |
| HIF423 | 1.3251 | HIF423/HOI | 0.5769 | SGI423 | −0.1187 | \| SGI423 \|/(\| SGI423 \| + TP4) | 0.1292 |
| HIF511 | 0.5967 | HIF511/HOI | 0.2598 | SGI511 | −0.0372 | \| SGI511 \|/(\| SGI511 \| + TP5) | 0.0445 |
| HIF512 | 0.9844 | HIF512/HOI | 0.4285 | SGI512 | −0.0695 | \| SGI512 \|/(\| SGI512 \| + TP5) | 0.0800 |
| HIF513 | 1.3909 | HIF513/HOI | 0.6055 | SGI513 | −0.1367 | \| SGI513 \|/(\| SGI513 \| + TP5) | 0.1460 |
| HIF521 | 1.4159 | HIF521/HOI | 0.6164 | SGI521 | −0.4022 | \| SGI521 \|/(\| SGI521 \| + TP5) | 0.3345 |
| HIF611 | 0.7162 | HIF611/HOI | 0.3118 | SGI611 | −0.1911 | \| SGI611 \|/(\| SGI611 \| + TP6) | 0.1928 |
| HIF621 | 0.5972 | HIF621/HOI | 0.2600 | SGI621 | −0.0735 | \| SGI621 \|/(\| SGI621 \| + TP6) | 0.0841 |

Sixth Embodiment

Figure 6A:
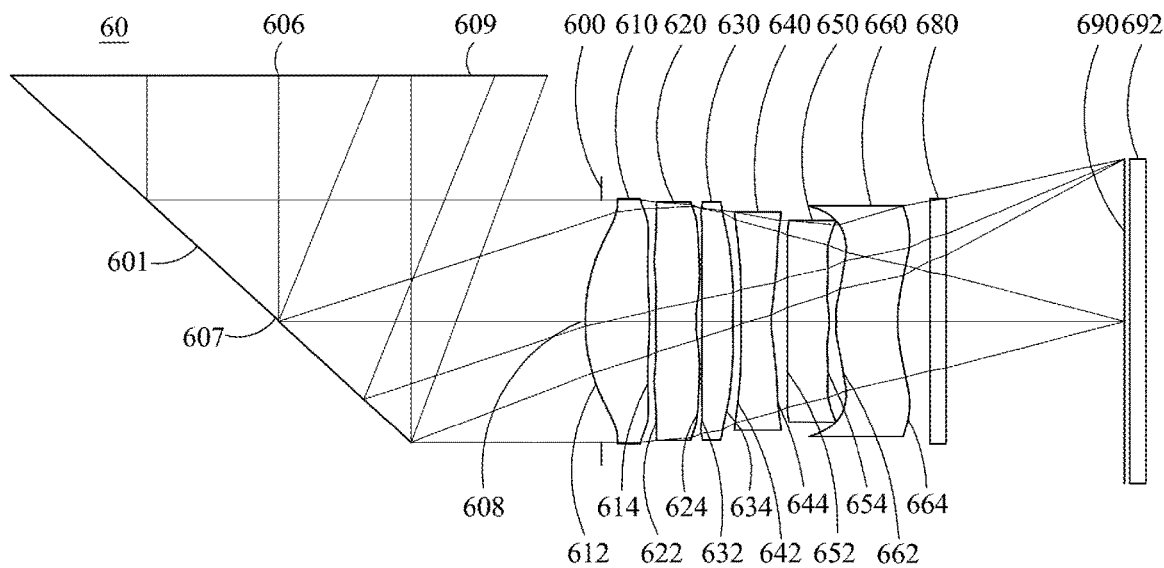
FIG. 6A is a schematic view of the optical image capturing system according to the sixth embodiment of the present invention.
Figure 6B:
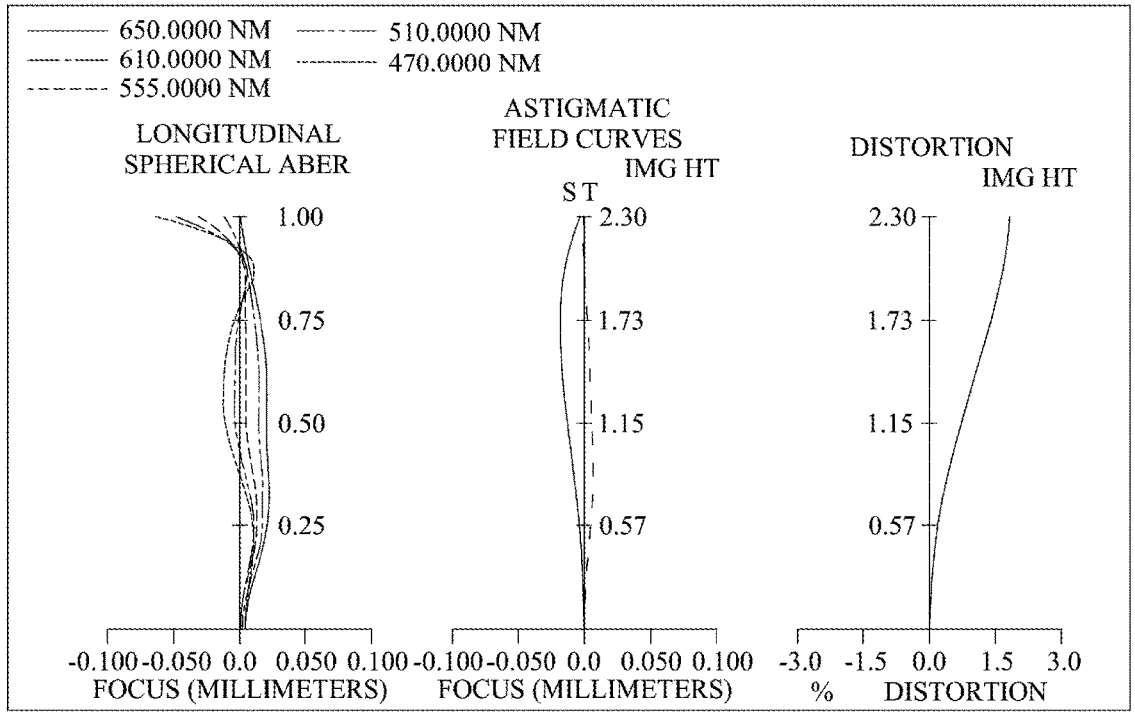
FIG. 6B is a curve diagram illustrating the spherical aberration, astigmatism and optical distortion of the optical image capturing system in order from left to right according to the sixth embodiment of the present invention.
Figure 6C:
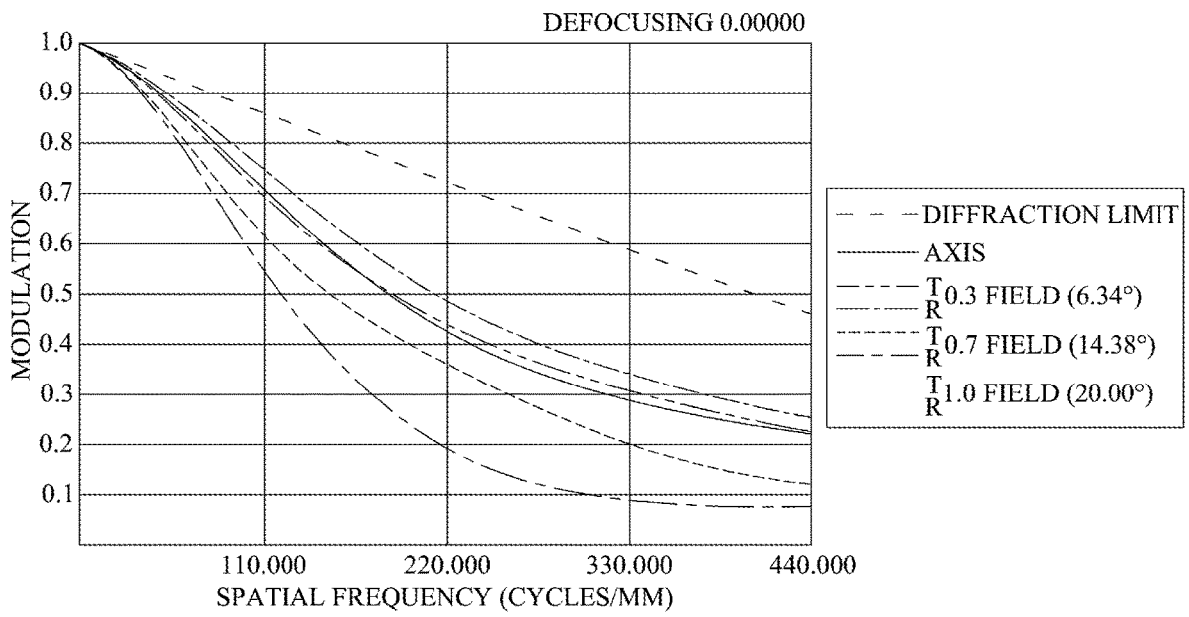
FIG. 6C is a characteristic diagram of modulation transfer of visible light spectrum for the optical image capturing system according to the sixth embodiment of the present invention.

Please refer to FIGS. 6A to 6C. FIG. 6A is a schematic view of the optical image capturing system according to the sixth embodiment of the present invention. FIG. 6B is a curve diagram illustrating the spherical aberration, astigmatism and optical distortion of the optical image capturing system in order from left to right according to the sixth embodiment of the present invention. FIG. 6C is a characteristic diagram of modulation transfer of visible light spectrum for the optical image capturing system according to the sixth embodiment of the present invention. As shown in FIG. 6A, an optical image capturing system is provided, which includes, in the order from the object side to the image side, a reflector 602, a first lens 610, a second lens 620, an aperture 600, a third lens 630, a fourth lens 640, a fifth lens 650, a sixth lens 660, an IR-cut filter 680, an image plane 690, and an image sensor element 692.

In the electronic device installed with the optical image capturing system of this embodiment, a mechanism light incident hole 609 can be formed on an object side, to limit the path of incident light on the object side. The mechanism light incident hole 609 has a diameter DDH=7.0 mm. A distance from the mechanism light incident hole 609 to a center, where the optical axis passes, of an object side surface of the first lens 610 is 7.910 mm. The reflective element can be the reflector 601 and disposed in front of the first lens 610. The light of central field of view bounces off the reflecting point 607 on the reflector 601, and then exits the reflector 601 to enter the first lens 610.

The first lens 610 has positive refractive power and is made of plastic. The object side 612 of the first lens 610 is a convex surface and the image side 614 of the first lens 610 is a convex surface, and the object side 612 and the image side 614 are aspheric. The object side 612 has one inflection point, and the image side 614 has two inflection points The second lens 620 has negative refractive power and is made of plastic. The object side 622 of the second lens 620 is a concave surface and the image side 624 of the second lens 620 is a concave surface, and the object side 622 and the image side 624 are aspheric. The object side 622 has two inflection points, and the image side 624 has one inflection point.

The third lens 630 has positive refractive power and is made of plastic. An object side 632 of the third lens 630 is a convex surface and an image side 634 of the third lens 630 is a convex surface, and the object side 632 and the image side 634 are both aspheric. The object side 632 has one inflection point, and the image side 634 has two inflection points.

The fourth lens 640 has negative refractive power and is made of plastic. An object side 642 of the fourth lens 640 is a convex surface and an image side 644 of the fourth lens 640 is a concave surface, and the object side 642 and the image side 644 are both aspheric. The object side 642 has two inflection points, and the image side 644 has two inflection points.

The fifth lens 650 has positive refractive power and is made of plastic. An object side 652 of the fifth lens 650 is a concave surface and an image side 654 of the fifth lens 650 is a convex surface, and the object side 652 and the image side 654 are both aspheric. The object side 652 has two inflection points and the image side 654 has one inflection point.

The sixth lens 660 has positive refractive power and is made of plastic. An object side 662 of the sixth lens 660 is a convex surface and an image side 664 of the sixth lens 660 is a concave surface, and the object side 662 and the image side 664 are both aspheric. The object side 662 has one inflection point and the image side 664 has one inflection point.

The IR-cut filter 680 is made of glass, and disposed between the sixth lens 660 and the image plane 690, and does not affect the focal length of the optical image capturing system.

Please refer to Table 11 and Table 12

TABLE 11

Lens Parameters for the Sixth Embodiment
f(Focal length) = 6.187 mm; f/HEP = 1.8; HAF(half angle of view) = 20.0 deg

| Surface | | Curvature Radius | Thickness (mm) | Material | Refractive index | Dispersion coefficient | Focal length |
|---|---|---|---|---|---|---|---|
| 0 | Object | 1E+18 | −1E+18 | | | | |
| 1 | | 1E+18 | −3.500 | | | | |
| 2 | Reflector | 1E+18 | 4.200 | Glass | | | |
| 3 | | 1E+18 | −0.209 | | | | |
| 4 | Lens 1 | 2.54124229 | 0.840 | Plastic | 1.544 | 56.090 | 3.821 |
| 5 | | −10.27479898 | 0.101 | | | | |
| 6 | Lens 2 | −6.181553133 | 0.526 | Plastic | 1.584 | 29.878 | −6.877 |
| 7 | Aperture | 10.49259217 | 0.058 | | | | |
| 8 | Lens 3 | 9.566017285 | 0.407 | Plastic | 1.544 | 56.090 | 10.305 |
| 9 | | −13.4490432 | 0.106 | | | | |
| 10 | Lens 4 | 16.76019441 | 0.404 | Plastic | 1.661 | 20.361 | −5.108 |
| 11 | | 2.803572291 | 0.195 | | | | |
| 12 | Lens 5 | −15.27289282 | 0.543 | Plastic | 1.661 | 20.361 | 27.811 |
| 13 | | −8.49434048 | 0.100 | | | | |
| 14 | Lens 6 | 2.142054144 | 0.811 | Plastic | 1.636 | 23.890 | 16.553 |
| 15 | | 2.296305267 | 0.421 | | | | |
| 16 | IR-cut filter | 1E+18 | 0.200 | BK_7 | 1.517 | 64.13 | |
| 17 | | 1E+18 | 2.312 | | | | |
| 18 | Image plane | 1E+18 | 0.000 | | | | |

Reference wavelength = 555 nm; Shield position: The clear aperture of the sixth surface is 1.700 mm. The clear aperture of the seventh surface is 1.700 mm. The clear aperture of the eighth surface is 1.700 mm. The clear aperture of the ninth surface is 1.700 mm.
The clear aperture of the tenth surface is 1.550 mm.

Table 12: coefficients of aspheric surfaces of sixth embodiment

TABLE 12

Aspheric Coefficients

| Surface | 4 | 5 | 6 | 7 | 8 | 9 | 10 |
|---|---|---|---|---|---|---|---|
| k | −5.318311E−01 | 2.920417E+01 | 3.495029E+00 | 1.838356E+01 | −2.202566E+02 | 5.104742E+01 | −9.000000E+01 |
| A4 | −5.129597E−03 | 3.145526E−02 | 7.469314E−02 | −4.903962E−02 | −7.151030E−02 | 5.480840E−02 | −2.169430E−02 |
| A6 | −8.001084E−04 | 1.079637E−02 | −1.623378E−02 | 3.070054E−02 | 6.395599E−02 | −6.699189E−02 | −4.615030E−02 |
| A8 | 5.723312E−04 | −9.847854E−03 | −2.003569E−04 | −1.356078E−02 | −2.537259E−02 | 2.292984E−02 | 2.896290E−02 |
| A10 | −7.398923E−04 | 1.370187E−03 | 1.031988E−04 | 1.813614E−03 | 3.736389E−03 | −2.181563E−03 | −4.089481E−03 |

| Surface | 11 | 12 | 13 | 14 | 15 |
|---|---|---|---|---|---|
| k | −1.410679E+01 | 0.000000E+00 | −8.520464E−01 | −8.822659E+00 | −3.235347E+00 |
| A4 | −6.704931E−02 | 0.000000E+00 | 4.020764E−02 | −4.723651E−02 | −7.960934E−02 |
| A6 | −2.271581E−02 | 0.000000E+00 | 3.236755E−02 | −1.483344E−02 | 1.655785E−02 |
| A8 | 3.199150E−02 | 0.000000E+00 | −2.581969E−02 | 6.921962E−03 | −3.966296E−03 |
| A10 | −5.905454E−03 | 0.000000E+00 | 6.595756E−03 | −3.153259E−03 | 3.315414E−04 |

In the sixth embodiment, the aspheric surface formula is presented in the same way in the first embodiment. In addition, the definitions of parameters in following Table s are the same as those in the first embodiment. Therefore, similar description shall not be illustrated again.

The values stated as follows can be obtained according to Table 11 and Table 12

Sixth embodiment (Reference wavelength = 555 nm)

| MTFQ0 | MTFQ3 | MTFQ7 | MTFH0 | MTFH3 | MTFH7 |
|---|---|---|---|---|---|
| 0.71 | 0.7 | 0.62 | 0.43 | 0.44 | 0.35 |

| ETP1 | ETP2 | ETP3 | ETP4 | ETP5 | ETP6 |
|---|---|---|---|---|---|
| 0.317 | 0.454 | 0.242 | 0.667 | 1.168 | 1.407 |

-continued

| Sixth embodiment (Reference wavelength = 555 nm) | | | | | |
|---|---|---|---|---|---|
| ETP1/TP1 | ETP2/TP2 | ETP3/TP3 | ETP4/TP4 | ETP5/TP5 | ETP6/TP6 |
| 0.377 | 0.863 | 0.595 | 1.653 | 2.150 | 1.735 |
| ETL | EBL | EIN | EIR | PIR | EIN/ETL |
| 6.595 | 2.914 | 3.681 | 0.401 | 0.421 | 0.558 |
| SETP/EIN | EIR/PIR | SETP | STP | SETP/STP | BL |
| 1.156 | 0.954 | 4.255 | 3.530 | 1.205 | 2.933 |
| ED12 | ED23 | ED34 | ED45 | ED56 | EBL/BL |
| 0.174 | 0.166 | 0.238 | 0.146 | 1.005 | 0.9935 |
| SED | SIN | SED/SIN | ED12/ED23 | ED23/ED34 | ED34/ED45 |
| 0.574 | 0.559 | −1.026 | 1.047 | 0.697 | 1.626 |
| ED12/IN12 | ED23/IN23 | ED34/IN34 | ED45/IN45 | ED56/IN56 | ED45/ED56 |
| 1.710 | 2.878 | 2.247 | 0.751 | −0.048 | 0.145 |
| \| f/f1 \| | \| f/f2 \| | \| f/f3 \| | \| f/f4 \| | \| f/f5 \| | \| f/f6 \| |
| 1.61920 | 0.89957 | 0.60035 | 1.21110 | 0.22245 | 0.37373 |
| ΣPPR | ΣNPR | ΣPPR/\|ΣNPR\| | IN12/f | IN56/f | TP4/(IN34 + TP4 + IN45) |
| 2.12219 | 2.51877 | 0.84255 | 0.01640 | 0.01616 | 0.57331 |
| \| f1/f2 \| | \| f2/f3 \| | (TP1 + IN12)/TP2 | | (TP6 + IN56)/TP5 | |
| 0.55556 | 0.66738 | 1.79097 | | 1.67621 | |
| HOS | InTL | HOS/HOI | InS/HOS | ODT % | TDT % |
| 7.02286 | 4.08983 | 3.05741 | 0.97023 | 2.00001 | 0.91450 |
| HVT51 | HVT52 | HVT61 | HVT62 | HVT62/HOI | HVT62/HOS |
| 0.551643 | 0.73843 | 1.03466 | 1.21780 | 0.53017 | 0.17341 |
| TP2/TP3 | TP3/TP4 | InRS61 | InRS62 | \| InRS61 \|/TP6 | \| InRS62 \|/TP6 |
| 1.29143 | 1.00869 | 0.03211 | 0.05932 | 0.03961 | 0.07317 |

The values stated as follows can be obtained according to Table 11 and Table 12.

| Values Related to Inflection Point of Sixth Embodiment (Primary Reference Wavelength = 555 nm) | | | | | | | |
|---|---|---|---|---|---|---|---|
| HIF111 | 1.2685 | HIF111/HOI | 0.5522 | SGI111 | 0.3056 | \| SGI111 \|/(\| SGI111 \| + TP1) | 0.2668 |
| HIF121 | 0.5058 | HIF121/HOI | 0.2202 | SGI121 | −0.0105 | \| SGI121 \|/(\| SGI121 \| + TP1) | 0.0123 |
| HIF122 | 1.1279 | HIF122/HOI | 0.4910 | SGI122 | −0.0170 | \| SGI122 \|/(\| SGI122 \| + TP1) | 0.0198 |
| HIF211 | 0.4604 | HIF211/HOI | 0.2004 | SGI211 | −0.0141 | \| SGI211 \|/(\| SGI211 \| + TP2) | 0.0260 |
| HIF212 | 1.2531 | HIF212/HOI | 0.5455 | SGI212 | −0.0124 | \| SGI212 \|/(\| SGI212 \| + TP2) | 0.0231 |
| HIF221 | 0.5051 | HIF221/HOI | 0.2199 | SGI221 | 0.0096 | \| SGI221 \|/(\| SGI221 \| + TP2) | 0.0179 |
| HIF311 | 0.3330 | HIF311/HOI | 0.1450 | SGI311 | 0.0047 | \| SGI311 \|/(\| SGI311 \| + TP3) | 0.0113 |
| HIF312 | 1.4268 | HIF312/HOI | 0.6211 | SGI312 | 0.0002 | \| SGI312 \|/(\| SGI312 \| + TP3) | 0.0006 |
| HIF321 | 1.3785 | HIF321/HOI | 0.6001 | SGI321 | −0.1013 | \| SGI321 \|/(\| SGI321 \| + TP3) | 0.1992 |
| HIF411 | 0.3663 | HIF411/HOI | 0.1595 | SGI411 | 0.0035 | \| SGI411 \|/(\| SGI411 \| + TP4) | 0.0085 |
| HIF412 | 1.1854 | HIF412/HOI | 0.5161 | SGI412 | −0.0423 | \| SGI412 \|/(\| SGI412 \| + TP4) | 0.0949 |
| HIF421 | 0.4948 | HIF421/HOI | 0.2154 | SGI421 | 0.0357 | \| SGI421 \|/(\| SGI421 \| + TP4) | 0.0812 |
| HIF422 | 1.0590 | HIF422/HOI | 0.4610 | SGI422 | 0.0722 | \| SGI422 \|/(\| SGI422 \| + TP4) | 0.1518 |
| HIF511 | 0.2778 | HIF511/HOI | 0.1210 | SGI511 | −0.0021 | \| SGI511 \|/(\| SGI511 \| + TP5) | 0.0038 |
| HIF512 | 1.3596 | HIF512/HOI | 0.5919 | SGI512 | 0.0206 | \| SGI512 \|/(\| SGI512 \| + TP5) | 0.0366 |
| HIF521 | 0.4362 | HIF521/HOI | 0.1899 | SGI521 | −0.0096 | \| SGI521 \|/(\| SGI521 \| + TP5) | 0.0173 |
| HIF611 | 0.5849 | HIF611/HOI | 0.2546 | SGI611 | 0.0647 | \| SGI611 \|/(\| SGI611 \| + TP6) | 0.0739 |
| HIF621 | 0.6587 | HIF621/HOI | 0.2868 | SGI621 | 0.0767 | \| SGI621 \|/(\| SGI621 \| + TP6) | 0.0865 |

The above description is merely illustrative rather than restrictive. Any equivalent modification or alteration without departing from the spirit and scope of the present invention should be included in the appended claims.

What is claimed is:

1. An optical image capturing system, from an object side to an image side, comprising:
   a first lens with refractive power;
   a second lens with refractive power;
   a third lens with positive refractive power;
   a fourth lens with refractive power;
   a fifth lens with refractive power;
   a sixth lens with refractive power;
   an image plane; and
   at least one reflective element, wherein the optical image capturing system comprises the six lenses with refractive power, the reflective element is disposed in front of the image plane, focal lengths of the first lens through the sixth lens are f1, f2, f3, f4, f5 and f6, respectively, and a focal length of the optical image capturing system is f, the entrance pupil diameter of the optical image capturing system is denoted by HEP, a distance on an optical axis from an object side of the first lens to the image plane is denoted by HOS, a half maximum angle of view of the optical image capturing system is denoted by HAF, thicknesses of the first lens to the sixth lens at height of ½ HEP parallel to the optical axis are respectively denoted by ETP1, ETP2, ETP3, ETP4, ETP5 and ETP6, a sum of ETP1 to ETP6 described above is denoted by SETP, thicknesses of the first lens to the sixth lens on the optical axis are respectively denoted by TP1, TP2, TP3, TP4, TP5 and TP6, a sum of TP1 to TP6 described above is denoted by STP, and the following conditions are satisfied:

$1.0 \leq f/HEP \leq 10.0;$ $0 \text{ deg} < HAF \leq 150 \text{ deg};$ $0.5 \leq HOS/f \leq 15;$ $0.5 \leq SETP/STP < 1$; and $1.49841 \leq |f3/f2| \leq 3.81810$.

2. The optical image capturing system according to claim 1, wherein a maximum height for image formation on the image plane perpendicular to an optical axis in the optical image capturing system is HOI, and the following condition is satisfied: $0.5 \leq HOS/HOI \leq 10$.

3. The optical image capturing system according to claim 1 wherein the reflective element is a reflective mirror.

4. The optical image capturing system according to claim 1, wherein the reflective element is a prism.

5. The optical image capturing system according to claim 4, wherein a thickness of the prism is denoted by PT, and the following condition is satisfied: $0 \text{ mm} < PT \leq 5 \text{ mm}$.

6. The optical image capturing system according to claim 1, wherein the contrast transfer rates (MTF values) with spatial frequencies of 110 cycles/mm at the optical axis, 0.3 field of view, and 0.7 field of view of visible light spectrum on the image plane are respectively denoted by MTFQ0, MTFQ3 and MTFQ7, and the following conditions are satisfied:

$MTFQ0 \geq 0.2$;

$MTFQ3 \geq 0.01$; and $MTFQ7 \geq 0.01$.

7. The optical image capturing system according to claim 1, wherein a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the sixth lens at height of ½ HEP is denoted by EIN, and the following condition is satisfied:

$0.2 \leq EIN/ETL < 1$.

8. The optical image capturing system according to claim 7, wherein the following condition is satisfied:

$0.3 \leq SETP/EIN < 1$.

9. The optical image capturing system according to claim 1, further comprising an aperture, wherein a distance from the aperture to the image plane on the optical axis is denoted by InS, and the following condition is satisfied:

$0.1 \leq InS/HOS \leq 1.1$.

10. An optical image capturing system, from an object side to an image side, comprising:
  a first lens with refractive power;
  a second lens with refractive power;
  a third lens with positive refractive power;
  a fourth lens with refractive power;
  a fifth lens with refractive power;
  a sixth lens with refractive power;
  an image plane; and
  at least one reflective element, wherein the optical image capturing system comprises the six lenses with refractive power, the reflective element is disposed in front of the sixth lens, focal lengths of the first lens through the sixth lens are f1, f2, f3, f4, f5 and f6, respectively, and a focal length of the optical image capturing system is f, the entrance pupil diameter of the optical image capturing system is denoted by HEP, a distance on an optical axis from an object side of the first lens to the image plane is denoted by HOS, a half maximum angle of view of the optical image capturing system is denoted by HAF, a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the sixth lens at height of ½ HEP is denoted by EIN, and the following conditions are satisfied:

$1.0 \leq f/HEP \leq 10.0$;

$0 \text{ deg} < HAF \leq 150 \text{ deg}$;

$0.5 \leq HOS/f \leq 15$;

$0.2 \leq EIN/ETL < 1$; and $1.49841 \leq |f3/f2| \leq 3.81810$.

11. The optical image capturing system according to claim 10, wherein a maximum height for image formation on the image plane perpendicular to an optical axis in the optical image capturing system is HOI, and the contrast transfer rates (MTF values) with spatial frequencies of 110 cycles/mm at the optical axis, 0.3 HOI, and 0.7 HOI of visible light spectrum on the image plane are respectively denoted by MTFQ0, MTFQ3 and MTFQ7, and the following conditions are satisfied:

$MTFQ0 \geq 0.2$;

$MTFQ3 \geq 0.01$; and $MTFQ7 \geq 0.01$.

12. The optical image capturing system according to claim 10, wherein the reflective element is a prism made of glass.

13. The optical image capturing system according to claim 10, wherein a distance on an optical axis from the object side of the first lens to the image side of the sixth lens is denoted by InTL, a thickness of the prism is denoted by PT, and the following condition is satisfied: $0 < InTL/PT \leq 3$.

14. The optical image capturing system according to claim 10, wherein a thickness of the prism is denoted by PT, and the following condition is satisfied: $0 < PT/HEP \leq 5$.

15. The optical image capturing system according to claim 10, wherein a refractive index of the prism is denoted by PND, and the following condition is satisfied: $1.7 \leq PND$.

16. The optical image capturing system according to claim 10, wherein a horizontal distance parallel to the optical axis from a third coordinate point on an image side of the fifth lens at height of ½ HEP to a fourth coordinate point on an object side of the sixth lens at height of ½ HEP is denoted by ED56, a distance between the fifth lens and the sixth lens on the optical axis is denoted by IN56, and the following condition is satisfied:

$0 < ED56/IN56 \leq 50$.

17. The optical image capturing system according to claim 10, wherein at least one among the first lens through the sixth lens is made of glass.

18. The optical image capturing system according to claim 10, wherein a distance between the first lens and the second lens on the optical axis is denoted by IN12, and following condition is satisfied: $0 < IN12/f \leq 60$.

19. The optical image capturing system according to claim 10, further comprising a light filtering element disposed between the sixth lens and the image plane, a distance parallel to the optical axis from a second coordinate point on the image side of the sixth lens at height of ½ HEP to the light filtering element is denoted by EIR, a distance parallel to the optical axis from an intersection point where the image side of the sixth lens crosses the optical axis to the light filtering is denoted by PIR, and the following condition is satisfied:

$0.1 \leq EIR/PIR \leq 1.1$.

20. An optical image capturing system, from an object side to an image side, comprising:
    a mechanism pinhole limiting a path of light incident from an object side, and having a diameter denoted by DDH;
    a first lens with refractive power;
    a second lens with refractive power;
    a third lens with positive refractive power;
    a fourth lens with refractive power;
    a fifth lens with refractive power;
    a sixth lens with refractive power;
    an image plane; and
    at least one reflective element disposed in front of the third lens, wherein the optical image capturing system comprises the six lenses with refractive power, a maximum height for image formation on the image plane perpendicular to an optical axis in the optical image capturing system is HOI, at least one of the first lens through the sixth lens is made of glass, focal lengths of the first lens through the sixth lens are f1, f2, f3, f4, f5 and f6, respectively, and a focal length of the optical image capturing system is f, the entrance pupil diameter of the optical image capturing system is denoted by HEP, a half maximum angle of view of the optical image capturing system is denoted by HAF, a distance on an optical axis from an object side of the first lens to the image plane is denoted by HOS, a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the sixth lens at height of ½ HEP is denoted by EIN, and the following conditions are satisfied:

$1.0 \leq f/HEP \leq 10$;

$0 \text{ deg} < HAF \leq 150 \text{ deg}$;

$0.5 \leq HOS/f \leq 15$;

$0.5 \leq HOS/HOI \leq 10$;

$0.2 \leq EIN/ETL < 1$;

$0 < DDH \leq 10 \text{ mm}$; and $1.49841 \leq |f3/f2| \leq 3.81810$.

21. The optical image capturing system according to claim 20, wherein the contrast transfer rates (MTF values) with spatial frequencies of 220 cycles/mm at the optical axis, 0.3 HOI, and 0.7 HOI of visible light spectrum on the image plane are respectively denoted by MTFH0, MTFH3 and MTFH7, and the following conditions are satisfied:

$MTFH0 \geq 0.2$;

$MTFH3 \geq 0.01$; and $MTFH7 \geq 0.01$.

22. The optical image capturing system according to claim 20, wherein the reflective element is a prism.

23. The optical image capturing system according to claim 22, wherein a distance on an optical axis from the object side of the first lens to the image side of the sixth lens is denoted by InTL, a thickness of the prism is denoted by PT, and the following condition is satisfied: $0 < InTL/PT \leq 3$.

24. The optical image capturing system according to claim 20, wherein the first lens has negative refractive power.

25. The optical image capturing system according to claim 20, further comprising an aperture stop, an image sensing device and a driving module, wherein the image sensing device is disposed on the image plane, a distance on the optical axis from the aperture stop to the image plane is denoted by InS, and the driving module couples with the lenses to displace the lenses, and the following condition is satisfied:

$0.2 \leq InS/HOS \leq 1.1$.

* * * * *